(12) United States Patent
Gibbons et al.

(10) Patent No.: US 6,919,404 B2
(45) Date of Patent: Jul. 19, 2005

(54) HYBRID POLYMER MATERIALS FOR LIQUID CRYSTAL ALIGNMENT LAYERS

(75) Inventors: Wayne M. Gibbons, Bear, DE (US); Michael G. P. Reppy, Wilmington, DE (US); Patricia A. Rose, Wilmington, DE (US); Hanxing Zheng, Wilmington, DE (US)

(73) Assignee: Elsicon, Inc., Newark, DE (US)

( * ) Notice: Subject to any disclaimer, the term of this patent is extended or adjusted under 35 U.S.C. 154(b) by 0 days.

(21) Appl. No.: 10/273,794

(22) Filed: Oct. 18, 2002

(65) Prior Publication Data

US 2003/0232930 A1 Dec. 18, 2003

Related U.S. Application Data

(63) Continuation-in-part of application No. 10/174,132, filed on Jun. 17, 2002, which is a continuation-in-part of application No. 10/160,819, filed on May 31, 2002, now abandoned.

(51) Int. Cl.$^7$ .............................. C08L 77/12; C08L 79/08
(52) U.S. Cl. ...................... 525/180; 525/181; 525/421; 525/422; 525/426; 525/436
(58) Field of Search ................................. 525/180, 181, 525/421, 422, 426, 436

(56) References Cited

U.S. PATENT DOCUMENTS

| | | | |
|---|---|---|---|
| 4,157,430 A | | 6/1979 | Hergenrother et al. |
| 4,451,402 A | * | 5/1984 | D'Alelio et al. ............ 548/461 |
| 4,539,342 A | | 9/1985 | Lee et al. |
| 4,778,859 A | | 10/1988 | Ai et al. |
| 5,773,559 A | | 6/1998 | Miyamoto et al. |
| 5,824,377 A | | 10/1998 | Pirwitz et al. |
| 5,858,274 A | | 1/1999 | Mishina et al. |
| 5,958,292 A | | 9/1999 | Gibbons et al. |
| 6,214,923 B1 | * | 4/2001 | Goto et al. .................. 524/514 |
| 6,221,940 B1 | * | 4/2001 | Puyenbroek et al. ........ 524/174 |
| 6,224,788 B1 | | 5/2001 | Ogawa et al. |
| 6,335,409 B1 | | 1/2002 | Herr et al. |
| 6,340,506 B1 | | 1/2002 | Buchecker et al. |

FOREIGN PATENT DOCUMENTS

| | | |
|---|---|---|
| EP | 1229066 | 7/2002 |
| WO | 0153384 | 7/2001 |
| WO | 0172871 | 10/2001 |

OTHER PUBLICATIONS

J.L. Hedrick, et al. *Nanoporous Polyimides,* Advances in Polymer Science, vol. 141, 1–43, 1999.

J.L. Hedrick, et al. *Polyimide foams derived from a high Tg polyimide with grafted poly(alpha–methylstyrene),* Polymer, vol. 37, No. 33, 5229–5236, 1996.

Coessens, V., Pintauer, T., Matyjaszewski, K. *Functional Polymers by Atom Transfer Radical Polymerization,* Prog. Polym. Sci. 26, 337–377, 2001.

Hedrick, J.L., Hawker, C.J., Dipietro, R., Jerome, R., Charlier, Y. *The Use of Styrenic Copolymers to Generate Polyimide Nanofoams,* Polymer, vol. 36, No. 25, 4855–4866, 1995.

Kamigaito, M., Ando, T., Sawamoto, M. *Metal–Catalyzed Living Radical Polymerization,* Chem. Rev, 3689–3745, 2001.

Matyjaszewski, K., Nakagawa, Y., Gaynor, S., *Synthesis of Well–defined Azido and Amino End–functionalized Polystyrene by Atom Transfer Radical Polymerization.* Macromol. Rapid Commun. 18, 1057–1066, 1997.

\* cited by examiner

*Primary Examiner*—Ana Woodward
(74) *Attorney, Agent, or Firm*—Brian A. Gomez

(57) ABSTRACT

The present invention provides novel hybrid polymer optical alignment layers for inducing alignment of a liquid crystal medium. Hybrid polymers of this invention are prepared from at least one component selected from the group consisting of monomer, macromonomer and polymer within the class of polyimides, poly(amic acids) and esters thereof and at least one component selected from the group consisting of addition monomer and functionalized addition polymer wherein the two components are covalently bonded to form a copolymer. The invention further describes liquid crystal displays comprising the novel branched hybrid polymer optical alignment layers.

10 Claims, 1 Drawing Sheet

HYBRID POLYMER MATERIALS FOR LIQUID CRYSTAL ALIGNMENT LAYERS

CROSS-REFERENCE TO RELATED APPLICATION

This application is a Continuation-in-Part of U.S. application Ser. No. 10/174,132, filed Jun. 17, 2002, which is a Continuation-in-Part of U.S. application Ser. No. 10/160,819, filed May 31, 2002, now abandoned.

BACKGROUND OF THE INVENTION

The present invention relates to material for aligning liquid crystals, and liquid crystal optical elements.

Current liquid crystal display (LCD) elements include a product that utilize a twisted nematic mode, i.e., having a structure wherein the aligning direction of nematic liquid crystal molecules is twisted by 90° between a pair of upper and lower electrode substrates, a product utilizing a supertwisted nematic mode, utilizing a birefringent effect, i.e. having a structure wherein the aligning direction of nematic liquid crystal molecules is twisted by 180° to 300°, an in-plane-switching mode wherein both electrodes controlling the liquid crystal alignment are present on one substrate and the direction of the liquid crystal orientation in the plane of the substrate changes upon application of an electric field, and a product utilizing a ferroelectric liquid crystal substance or an antiferroelectric liquid crystal substance. Common to each of these products is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fibrous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed in U.S. Pat. Nos. 5,032,009 and 4,974,941 "Process of Aligning and Realigning Liquid Crystal Media".

The process for aligning liquid crystal media with polarized light can be a noncontact method of alignment that has the potential to reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios, long-term thermal and optical stability, and in many applications a controlled uniform pre-tilt angle.

Polymers used in forming optical alignment layers also must have a reasonably broad processing window. Polymers used as alignment layer in commercial liquid crystal displays are generally polyimide-based systems because of their good thermal and electrical properties.

One disadvantage to using polyimides in forming optical alignment layers is that they generally require high doses of polarized light (5–30 $J/cm^2$) to induce high quality optical alignment, as disclosed in U.S. Pat. No. 5,958,292. Disadvantages for requiring high doses of polarized light include low throughput in an assembly line due to increased residence time for the substrate in the exposure system, potential damage to the transistors and color filters needed in modern display systems and photodegradation of the alignment layer itself that may impair the long-term stability and performance of the device.

Photoactive polymers other than polyimides (such as polymethacrylates and polysiloxanes) that provide satisfactory quality alignment with low doses of polarized light (0.05–5 $J/cm^2$) have been described in U.S. Pat. No. 6,224,788, "Liquid Crystal Aligning Agent and Process for Producing Liquid Crystal Alignment Film Using the Same" and U.S. Pat. No. 5,824,377 "Photosensitive Material for Orientation of Liquid Crystal Device and Liquid Crystal Device Thereof". When irradiated with polarized light, these materials undergo photo-crosslinking to produce optical alignment layers. Advantages of these polymers include higher mobility of the polymer backbone leading to more efficient photo-crosslinking reactions and higher densities of photoreactive species due to the smaller repeat unit for the polymer. The high density and high mobility of photoreactive groups leads to the requirement of lower doses of polarized light for good alignment. However, the listed physical features that provide advantages in the optical density thresholds can provide for reduced electrical performance and optical stability of devices. In, for example, a thin film transistor TN display, this can result in an inadequate voltage holding ratio (VHR, a measure of the voltage drop in the display after the voltage has been switched off).

An approach to incorporating multiple desired properties (such as improving VHR) of materials for optical alignment layers is described in WO 99/49360 "Liquid Crystal Orientation Layer" and WO 01/72871 A1 "Polymer Blend for Preparing Liquid Crystal Alignment Layer." Blends of polymeric compounds containing photoreactive polymers (typically non-polyimide) and polyimides are proposed as a method to improve the inadequate VHR of the non-polyimide by blending with material having high VHR (typically a polyimide). The blends have the disadvantage of limited miscibility and, thus, limit the quantity of photoreactive material available for alignment.

An approach to incorporating multiple desired properties into a polyimide for conventional liquid crystal alignment layers has been described in U.S. Pat. No. 5,773,559 "Polyimide Block Copolymer and Liquid Crystal Alignment Layer Forming Agent". In this process, polyimide block copolymers, wherein a polyimide-type block is copolymerized with a different polyimide-type block, are described which provide multiple properties that are difficult to obtain by conventional polyimide synthesis.

Copolymerization of related monomers is well known in the art. Less well known is the copolymerization of unrelated monomers or polymers to form copolymers, particularly between polyimide-type polymers and addition-type polymers. Curable compositions of polyimides containing reactive double-bonds combined with crosslinking reagents such as tetraethylene glycol diacrylate for use in electronic or optical components have been described in, for example, U.S. Pat. No. 4,778,859. These materials form a cross-linked matrix during cure conditions, however the architecture of the matrix that is formed is not known and cannot be controlled. Hedrick et al (*Polymer,* Vol 36, No 25, 4855–4866, 1995) describes the synthesis of triblock copolymers wherein the polyimide block is terminated by polystyrene oligomers. These materials are specifically designed to undergo microphase separation. Upon heating, the thermally unstable polystyrene blocks decompose, leaving nanometer size pores in the structure. U.S. Pat. No.

4,539,342 "Polyimide Foam Prepared from Amino Terminated Butadiene Acrylonitrile Reactant" describes a polyimide foam wherein one of the components is an amine-terminated butadiene-acrylonitrile copolymer. The described materials are known in the art as segmented block copolymers and provide foams that are flexible and resilient and provide high vapor-barrier characteristics. Similarly, U.S. Pat. No. 4,157,430 "Amine Terminated Polymers and the Formation of Block Copolymers" describes the synthesis of amine terminated butadiene polymers for the formation of block copolymers as thermoset rigid foams. The authors describe, but do not teach, the concept of copolymers with polyimides. However, microphase separation and polyimide foam characteristics, common features to the aforementioned papers and patents, are not desirable properties used in materials for liquid crystal alignment layers.

In further developing materials and processes for optical alignment layers, we have invented a new and novel copolymer comprising units from addition polymers and polyimides, which is described herein. These new materials for optical alignment layers were invented to remove or reduce the disadvantages of optical alignment layers described previously. We refer to this new class of polymers as hybrid polymers. These hybrid polymers are prepared from at least one component selected from the group consisting of monomer, macromonomer and polymer within the class of polyimides, poly(amic acids) and esters thereof and at least one component selected from the group consisting of addition monomer and functionalized addition polymer wherein the two components are covalently bonded to form a copolymer. This novel class of new, hybrid polymers combines the good thermal and electrical properties of polyimides with the high density and high mobility advantages of addition polymers such as polymethacrylates, polyacrylates, polyolefins and polystyrenes. In this way, multiple desirable properties that are difficult to obtain by other materials and processes can be achieved.

SUMMARY OF INVENTION

The present invention describes the composition of a hybrid polymer which is useful, especially as a liquid crystal optical alignment layer, and provides a plurality of desirable properties. Hybrid polymers of this invention are prepared from at least one component selected from the group consisting of monomer, macromonomer and polymer within the class of polyimides, poly(amic acids) and esters thereof and at least one component selected from the group consisting of addition monomer and functionalized addition polymer wherein the two components are covalently bonded to form a copolymer.

Another embodiment of the invention includes hybrid polymers of this invention that are prepared from at least one component selected from the group consisting of monomer, macromonomer and polymer within the class of polyimides, poly(amic acids) and esters thereof and at least one component selected from the group consisting of addition monomer and functionalized addition polymer wherein the two components are covalently bonded to form a copolymer.

A third embodiment of the invention is a branched hybrid polymer that is prepared from (a) at least one component selected from the group consisting of a polymer within class of polyimides, poly(amic acids) and esters thereof which further comprise at least one addition polymerization moiety as a sidechain, and (b) at least one component selected from the group consisting of addition monomer and functionalized addition polymer wherein the components (a) and (b) are covalently bonded to form a copolymer.

A fourth embodiment of the invention is a branched hybrid polymer that is prepared from (a) at least one component selected from the group consisting of a monomer, macromonomer and polymer within the class of polyimides, poly(amic acids) and esters thereof and (b) at least one component that is a functionalized addition polymer wherein the components (a) and (b) are covalently bonded to form a copolymer.

The invention further embodies optical alignment layers prepared from the hybrid polymers and liquid crystal display elements incorporating the optical alignment layers.

DETAILED DESCRIPTION OF THE INVENTION

Figure 1:
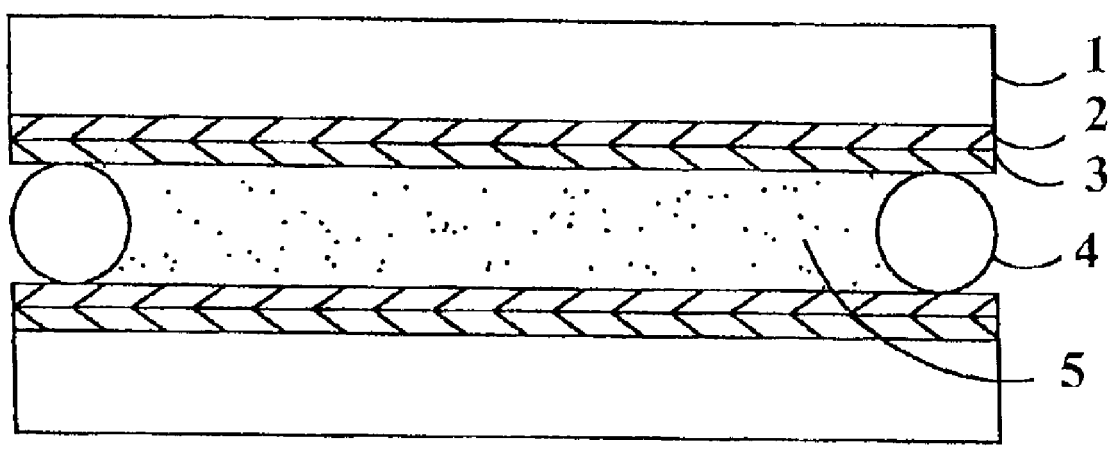
FIG. 1 is a cross-sectional view of a liquid crystal display element.

As used herein, the term "alignment layer" is the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

"Optical alignment layer" herein refers to an alignment layer that contains anisotropically absorbing molecules that will induce alignment of liquid crystals after exposure with polarized light. The optical alignment layer can be an isotropic medium or have some degree of anisotropy before optical alignment.

"Activated polyimides" of the invention are herein referred to as macromonomers or polymers within the class of polyimides, poly(amic acids) and esters thereof prepared by use of specifically functionalized diamines, dianhydrides, monoamines or monoanhydrides and/or by the stoichiometric mismatch of diamines and dianhydrides and/or by chemical modification of the polyimide, poly(amic acid) or ester thereof to incorporate polymerizable functional groups. The term "Activated" is not meant to restrict the polyimides to a specific mode of action. Rather, the term is meant to suggest to the artisan how the polymers may perform their function. The invention is not restricted to a specific mechanism of action in order to synthesize the desired hybrid polymer.

"Addition monomers" are herein defined as monomer units with a monoreactive group used in the polymerization of addition polymers or copolymers A "functionalized addition polymer" of the invention is herein referred to as an addition oligomer, polymer or polymer that contains one or more functionalized end-groups or side chains. These furactionalized moieties may include, but are not limited to, amines, diamines, anhydrides, dianhydrides, isocyanates and acid chlorides.

A "pre-functionalized addition monomer" of the invention is herein defined as an addition monomer used in the polymerization of addition polymers or copolymers that contains at least one other group that by, for example, chemical modification, can give a functionalized moiety. For example, an amine may be protected as a carbamate group such as t-butyl carbamate, an amide group such as an N-formyl group or an N-benzyl group. "Protective Groups in Organic Chemistry" (Theodora W. Greene, John Wiley and Sons, New York, 1981) describes many such protecting groups. Similarly, other groups, such as nitro groups, can be reduced to give amino groups. Anhydrides, for example, can be protected as a diester, or as the diacid or diacid salt. "Advanced Organic Chemistry, 4$^{th}$ Edition" (Jerry March, John Wiley and Sons, New York, 1992) describes many such modifications. Such group modifications can be performed optically, thermally, or by the addition of reagents in a reaction. The methods listed here are not meant to be limiting and one who is skilled in the art will realize that a large number of methods for group modifications can be performed to achieve the hybrid polymers of the invention.

A "functionalized addition polymer" of the invention is herein referred to as an addition macromonomer or polymer that contains one or more functionalized moieties. These functionalized moieties may include, but are not limited to, amines, diamines, anhydrides, dianhydrides, isocyanates, methacrylates, acrylates, methacrylamides, acrylamides, olefins, vinyls, styrenes, maleimides, norbornenes, and acid chlorides. A "pre-functionalized addition polymer" of the invention is herein defined as an addition macromonomer or polymer that contains at least one group that can be modified to give a functionalized addition polymer. "Functionalized" is not meant to restrict the moieties on the monomers, macromonomers or polymers to a specific mode of action. Rather, the term is meant to suggest to the artisan how the moieties on the monomers, macromonomers or polymers may perform their function. The invention is not restricted to a specific mechanism of action in order to synthesize the desired hybrid polymer.

"Addition polymerization moiety" or "Addition polymerization moieties" are one or more reactive groups covalently bonded to the activated polyimides that can undergo addition polymerization with an addition monomer or monomers or functionalized addition polymer or polymers.

A "branched copolymer" of the invention is herein referred to as a copolymer where the backbone contains one or more branch points.

A "hybrid polymer" of the invention is herein referred to as a polymer prepared from at least one component selected from the group consisting of monomer, macromonomer, and polymer within the class of polyimides, poly(amic acids) and esters thereof and at least one component selected from the group consisting of addition monomer and functionalized addition polymer wherein the two components are covalently bonded to form a copolymer.

A "branched hybrid polymer" is a hybrid polymer where the backbone contains one or more branch points.

Optical alignment layers are alignment layers that contain anisotropically absorbing molecules that will induce alignment of liquid crystals after exposure with polarized light. Optical alignment layers of the invention may be processed by conventional means, such as mechanical rubbing, prior to or after exposure to polarized light. The anisotropically absorbing molecules of the optical alignment layers exhibit absorption properties with different values when measured along axes in different directions. The anisotropic absorbing molecules exhibit absorption bands between 150 nm and about 2000 nm. Most preferable optical alignment layers for the present invention have absorbance maxima of about from 150 to 400 nm and especially about from 250 to 400 nm.

Polymers especially useful as optical alignment layers are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to give a poly(amic acid) prepolymer intermediate. Copolymer polyimides are materials prepared by the condensation of one or more diamines with one or more dianhydrides to give a copoly(amic acid).

An alternative intermediate to polyimides are poly(amic esters) that can be made by esterification of poly(amic acids) with alcohols. The poly(amic esters) undergo thermal imidization to form polyimides.

Thus, poly(amic acids) and poly(amic esters) are considered to be very closely related precursors to polyimides used in the invention. Therefore, poly(amic acids) and poly(amic esters) are considered useful for this invention. Furthermore, preimidized polyimides derived from chemical or thermal imidization of poly(amic acids) or poly(amic esters) are also considered useful for the invention. The novel polymers of the invention are hybrid polymers that comprise 5–95% or more preferably 25–75% of polymer within the class of polyimides, poly(amic acids) and esters thereof.

Activated polyimides useful for the invention are macromonomers or polymers within the class of polyimides, poly(amic acids) and esters thereof prepared by use of specifically functionalized diamines, dianhydrides, monoamines or monoanhydrides and/or by the stoichiometric mismatch of diamines and dianhydrides and/or by chemical modification of the polyimide, poly(amic acid) or ester thereof to incorporate polymerizable functional groups. A typical polyimide contains an equal number of anhydride and amine endgroup functionalities in the poly(amic acid) prepolymer. Polyimides prepared with stoichiometric mismatch will produce polymer chains that are terminated by the functionality in excess. For example, a 1.1 to 1.0 ratio of diamine to dianhydride will result in the majority of polymer chains having both ends terminating in amines. Similar results are obtained when monofunctional units (for example a monoamine or monoanhydride) are added to the monomer mix. The resultant polyimide will have most chains terminated by the monofunctional units.

A wide variety of dianhydrides may be useful in the preparation of novel hybrid polymers of the invention. Specific examples of tetracarboxylic dianhydride components include aromatic dianhydrides such as 3,3',4,4'-benzophenonetetracarboxylic dianhydride, pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4- cyclobutanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives. Preferred dianhydrides are 1,2,3,4-cyclobutanetetracarboxylic dianhydride, and 1,2,3,4-cyclopentanetetracarboxylic dianhydride. The most preferred dianhydride is 1,2,3,4-cyclobutanetetracarboxylic dianhydride.

Examples of monoanhydrides that may be used in preparing hybrid polymers of the invention include maleic anhydride, dimethyl maleic anhydride, citraconic anhydride, cis-5-norbornene-endo-2,3-dicarboxylic anhydride, cis-5-norbornene-exo-2,3-dicarboxylic anhydride, methyl-5-norbornene-2,3-dicarboxylic anhydride, endo-bicyclo[2.2.2]oct-5-ene-2,3-dicarboxylic anhydride, 1-methyl-5-cyclohexene-2,3-dicarboxylic anhydride, cis-1,2,3,6-tetrahydrophthalic anhydride, cis-4-methyl-1,2,3,6-tetrahydrophthalic anhydride, and exo-3,6-epoxy-1,2,3,6-tetrahydrophthalic anhydride.

A variety of diamines may be useful in the preparation of novel hybrid polymers of the invention including aromatic diamines such as 2,5-diaminobenzonitrile, 2-(trifluoromethyl)-1,4-benzenediamine, p-phenylenediamine, 2-chloro-1,4-benzenediamine, 2-fluoro-1,4-benzenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminonaphthalene, 1,4-bis(4-aminophenoxy)benzene, 4,4'-diaminobenzophenone, 3,4'-diaminobenzophenone, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, 2,4,6-trimethyl-1,3-phenylenediamine and 2,2-bis[4-(4-aminophenoxy)phenyl]hexafluoropropane; alicyclic diamines such as bis(4-aminocyclohexyl)methane; and aliphatic diamines such as tetramethylenediamine and hexamethylene diamine. Further, diaminosiloxanes such as bis(3-aminopropyl)tetramethyldisiloxane may be used. Such diamines may be used alone or in combination as a mixture of two or more of them. Preferred diamines for preparing hybrid polymers are bis(4-aminocyclohexyl)methane, 4,4'-methylenebis(2-methylcyclohexylamine), N,N-dipropyl-benzene-1,2,4-triamine, 2-(N,N-diallylamino)1,4-benzenediamine, 1-(N,N-diallylamino)-2,4-benzenediamine, 1-[4-vinylphenoxy]-2,5-benzenediamine, 1-[4-vinylphenoxy]-2,4-benzenediamine and 2,4,6-trimethyl-1,3-phenylenediamine.

Most preferred diamines that may be used in preparing hybrid polymers are shown in Table 1.

TABLE 1

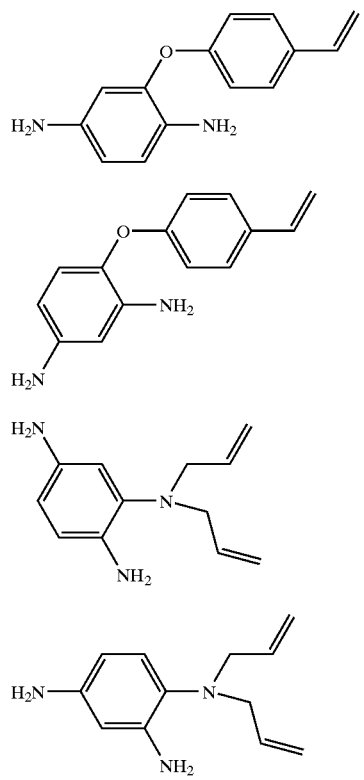

Preferred monoamines that may be used in preparing hybrid polymers include 3-vinyl aniline, 4-vinyl aniline and allyl amine. The most preferred monoamine is 4-vinyl aniline.

The novel polymers of the invention are hybrid polymers that comprise 5–95% or more preferably 25–75% of polymer within the class of addition polymers, including, but not limited to, polymethacrylates, polyacrylates, polystyrenes, polynorbornenes, polyolefins, and polyacrylamides. The addition polymer portion of the hybrid polymer can impart desired properties to the polyimide portion, such as stable pretilt and good optical alignment at low levels of irradiation.

A wide variety of addition monomers and functionalized addition polymers may be useful in the preparation of novel hybrid polymers of the invention. Preferred addition monomers and functionalized addition polymers that lead to improved optical alignment qualities of liquid crystal displays are those containing photoreactive groups capable of dimerization upon optical alignment. These photoreactive groups include, but are not limited to, 3-arylacrylic esters (cinnamates), chalcones and coumarin structures, as shown in Table 2. Examples of preferred addition monomers that are useful for the invention are further described in the following publications: U.S. Pat. No. 6,335,409 B1 (cinnamates), U.S. Pat. No. 6,224,788 (chalcones) and Jackson et al in *Chem. Mater.* (2001) 13, p 694–703 (coumarins).

TABLE 2 cinnamate
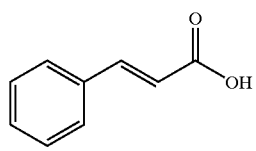

chalcone
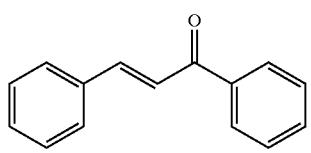

coumarin
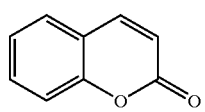

Most preferred addition monomers are shown in Table 3. When irradiated with polarized light, the hybrid polymers prepared from these monomers can undergo photo-crosslinking to produce optical alignment layers. In some instances uncrosslinked and crosslinked sites can establish pretilt in liquid crystal molecules in contact with the optical alignment layer.

TABLE 3

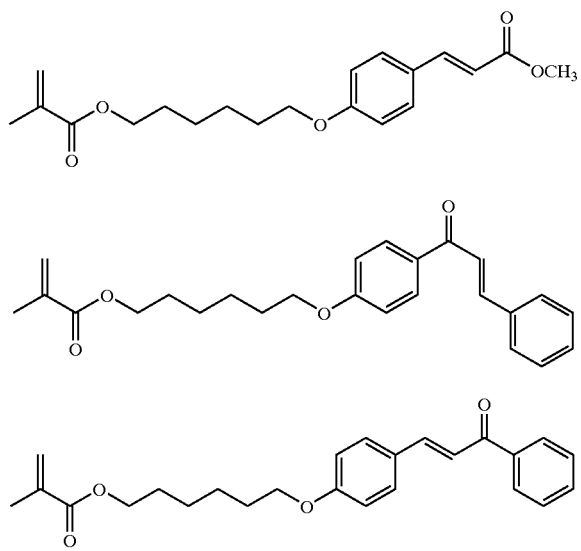

TABLE 3-continued

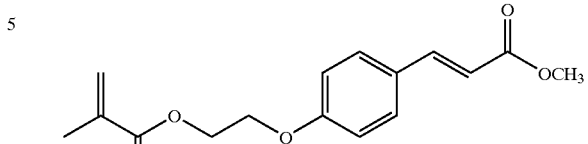

Most liquid crystal devices, including displays, have a finite pre-tilt angle, controlled, for instance, by the mechanical buffing of selected polymeric alignment layers. The liquid crystal molecule in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable. Several approaches have been explored to add pre-tilt to optical alignment layers for liquid crystal displays. One approach is the incorporation of long alkyl chains as sidechains in polyimide alignment layers, as described in U.S. Pat. No. 5,858,274. A second approach, described in U.S. Pat. No. 5,731,405, are polyimide optical alignment layers having C4–C20 fluorinated or partially fluorinated alkyl chains as sidechains. Preferred addition monomers or functionalized addition polymers of the invention that produce optical alignment layers with a defined angle of pre-tilt contain a C4–C24 alkyl chain (branched or linear) or a C4–C20 fluorinated or partially fluorinated alkyl chain. Some other preferred addition monomers or functionalized addition polymers of the invention that produce optical alignment layers with a defined angle of pre-tilt contain a photoreactive group capable of dimerizing upon optical alignment and also contain a C4–C24 alkyl chain (branched or linear) or a C4–C20 fluorinated or partially fluorinated alkyl chain. Table 4 shows examples of most preferred addition monomers that can be used in the preparation of the hybrid polymers of the invention. One who is skilled in the art will realize that there is a great variety of addition monomers and functionalized addition polymers that can impart these and other properties that will be useful to the invention.

TABLE 4

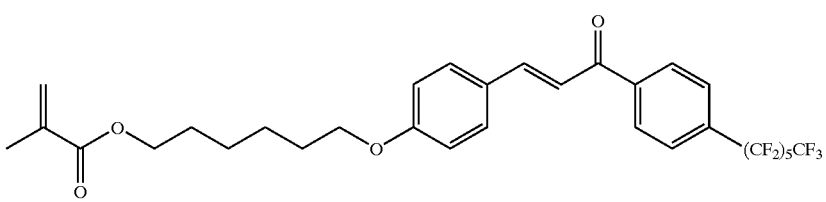

TABLE 4-continued

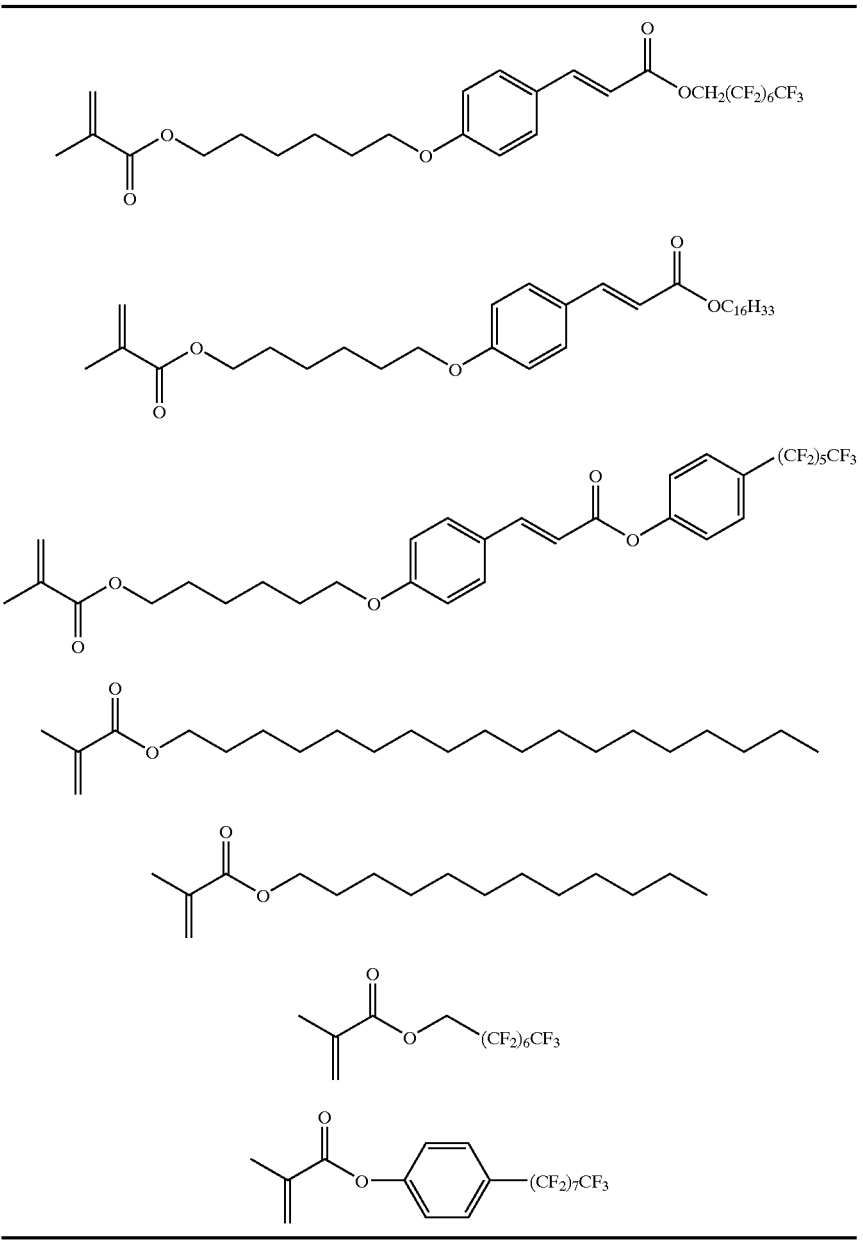

Functionalized addition polymers useful for the invention are macromonomers or polymers prepared from at least one selected from the group of methacrylates and derivatives, acrylates and derivatives, methacrylamides and derivatives, acrylamides and derivatives, olefins and derivatives, vinyls and derivatives, styrenes and derivatives, maleimides and derivatives and norbornenes and derivatives and mixtures thereof. Functionalized addition polymers of the invention can be macromonomers or polymers prepared from a wide range of addition monomers that can impart desired properties to the final hybrid polymer. Preferred functionalized addition polymers used in the preparation of hybrid polymers for optical alignment contain photoreactive groups capable of dimerization upon optical alignment and groups that add a uniform pre-tilt angle to liquid crystals in contact with the optical alignment layer. The preferred addition monomers used in preparing the functionalized addition polymers and capable of dimerizing upon optical alignment are shown in Table 3. Preferred addition monomers used in the preparation of hybrid polymers that produce optical alignment layers that generate a uniform angle of pre-tilt are shown in Table 4. Functionalized moieties may include, but are not limited to, amines, diamines, anhydrides, dianhydrides, isocyanates, methacrylates, acrylates, methacrylamides, acrylamides, olefins, vinyls, styrenes, maleimides, norbornenes, and acid chlorides. Preferred functionalized moieties in functionalized addition polymers of the invention are amines, diamines, anhydrides and dianhydrides. The functionalized moieties can be incorporated into the functionalized addition polymer as a functionalized addition monomer. Alternatively, they can be incorporated into the functionalized addition polymer as a modifiable group on an addition monomer (pre-functionalized addition monomer) and then can be modified into the functionalized moiety. The most preferred functionalized moiety is an amine. Functionalized addition polymers of the invention containing amine sidechains can be prepared by randomly incorporating a pre-functionalized addition monomer into a pre-functionalized addition polymer followed by a chemical modification. Preferred pre-functionalized addition monomers for this purpose are shown in Table 5.

TABLE 5

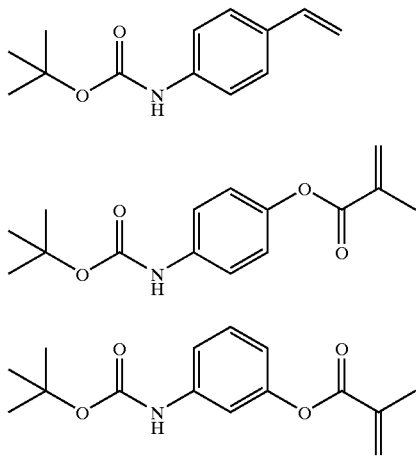

Another most preferred functionalized moiety is an anhydride. Functionalized addition polymers of the invention containing anhydride sidechains can be prepared by randomly incorporating appropriately functionalized addition monomers into a functionalized addition polymer. Preferred functionalized addition monomers for this purpose include maleic anhydride, dimethyl maleic anhydride, citraconic anhydride, cis-5-norbornene-endo-2,3-dicarboxylic anhydride, cis-5-norbornene-exo-2,3-dicarboxylic anhydride, methyl-5-norbornene-2,3-dicarboxylic anhydride, endo-bicyclo[2.2.2]oct-5-ene-2,3-dicarboxylic anhydride, 1-methyl-5-cyclohexene-2,3-dicarboxylic anhydride, cis-1,2,3,6-tetrahydrophthalic anhydride, cis-4-methyl-1,2,3,6-tetrahydrophthalic anhydride, and exo-3,6-epoxy-1,2,3,6-tetrahydrophthalic anhydride.

The novel polymers of this invention can be prepared by several methods, each of which can lead to a unique hybrid polymer architecture. These differ in the manner and order of synthesis and can independently provide useful materials of similar overall composition but different detailed molecular architecture. These methods are meant to exemplify various approaches to preparing the hybrid polymers and are not meant to limit the scope of the invention. The materials of the invention can be prepared by several methods of synthesis detailed herein:

Method 1:

An activated polyimide, as described by the general formulas 1 and 2, is prepared having both ends of the polymer functionalized with an addition polymerization moiety, for example by incorporation of either monofunctional amines or anhydrides that contain addition polymerization moieties, or by post processing of the poly(amic acid) prepolymer. Preferred end group addition polymerization moieties of the invention include but are not limited to methacrylates and derivatives, acrylates and derivatives, methacrylamides and derivatives, acrylamides and derivatives, allyl groups and derivatives, vinyl groups and derivatives, styrenes and derivatives, maleimides or maleic anhydrides and derivatives and norbornenes and derivatives. Most preferred end-group addition polymerization moieties are acrylamides and methacrylamides, which can be prepared by post modification of an off-stoichiometry poly (amic acid) containing amino end groups, and styrene groups, which can be prepared by synthesizing the poly (amic acid) with 4-vinylaniline as a monoamine end-capper.

The activated polyimides 1 and/or 2 are then copolymerized in an addition fashion with the addition monomer 3 to yield hybrid polymers. The preferred monorreactive group of the addition monomers of the invention independently include, but are not limited to: methacrylates and derivatives, acrylates and derivatives, methacrylamides and derivatives, acrylamides and derivatives, allyl groups and derivatives, vinyl groups and derivatives, styrenes and derivatives, maleimides or maleic anhydrides and derivatives and norbornenes and derivatives. Most preferred monoreactive groups of the addition monomers of the invention include methacrylates and derivatives and acrylates and derivatives.

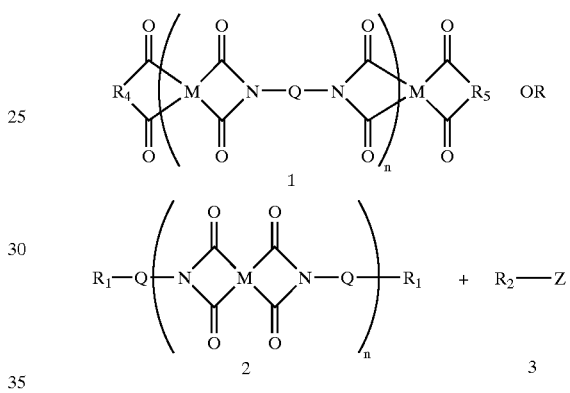

Where M is a tetravalent organic group, Q is a divalent organic group optionally substituted with fluorine, chlorine, cyano, alkyl, fluoroalkyl, alkoxy, alkylamino or diallylamino, $R_4$ and $R_5$ are each a mono or divalent organic group, $R_1$ and $R_2$ are each a monovalent organic group, each of which comprises a polymerization moiety, wherein $R_4$, $R_5$, $R_1$ and $R_2$ are at least one organic group independently selected from the group consisting of methacrylates and derivatives; acrylates and derivatives; methacrylamides and derivatives; acrylamides and derivatives; allyl groups and derivatives vinyl groups and derivatives, styrenes and derivatives, maleimides or maleic anhydrides and derivatives and norbornenes and derivatives and Z is a monovalent organic group and n is 3–5000. $R_1$, $R_2$, $R_4$, $R_5$, M, Q and Z can each independently represent a single chemical structure or a collection of distinct chemical structures.

One skilled in the art will realize that by controlling the conditions of the second polymerization to avoid complete cross-linking of the activated polyimide, soluble polymers can be obtained and uniform thin films for liquid crystal alignment can be prepared. The polymer architecture formed is a branched copolymer, where the addition monomer units and the reactive endgroups of the polyimide combine to form a linear polymer segment with a backbone structure of the addition polymer portion and the polyimide segments will form internal crosslinks between linear addition polymer segments or dangling branches off the side of linear polymer segments. The branched copolymer has advantages that prove useful for the invention. They provide higher molecular weight with crosslinking which decreases mobility and improves thermal stability. Furthermore, the copolymers may be less likely to phase separate, resulting in more uniform films and improved thermal stability. Despite these potential advantages, it should be noted that a branched hybrid polymer is one embodiment of the invention. However, one skilled in the art will recognize that the branching of the hybrid polymer is not a requirement of the invention.

Method 2:

An activated polyimide is prepared incorporating addition polymerization moieties in the sidechains of either the diamine or dianhydride monomers, as shown in the general formula 4. Preferred activated polyimides of the invention are prepared from either diamines or dianhydrides with sidechains containing allyl groups and derivatives, vinyl groups and derivatives, styrenes and derivatives, maleimides or maleic anhydrides and derivatives and norbornenes and derivatives. Most preferred activated polyimides of the invention are prepared using one or more diamines shown in Table 1. Preferred novel activated polyimides of the invention contain 1–100 mol % monomers incorporating addition polymerization moieties in the sidechain, and most preferred is 1–50 mol %.

The activated polyimide 4 is subsequently polymerized with the addition monomer 5 to yield hybrid polymers. The preferred monoreactive groups on the addition monomers of the invention independently include, but are not limited to: methacrylates and derivatives, acrylates and derivatives, methacrylamides and derivatives, acrylamides and derivatives, allyl groups and derivatives vinyl groups and derivatives, styrenes and derivatives, maleimides or maleic anhydrides and derivatives and norbornenes and derivatives. Most preferred monoreactive groups on the addition monomers of the invention include methacrylates and derivatives and acrylates and derivatives.

Method 3:

A functionalized addition polymer that is terminated with a monoamine or monoanhydride is prepared and then polymerized with diamine and dianhydride monomers for the synthesis of hybrid polymers, as shown in the general formula below. The structure of the hybrid polymer of this mode is known in the art as an ABA triblock copolymer, with the "A" portion representing the addition-polymer portions, which form the end sections of the polymer chains and the "B" portion represents the polyimide portion, which form the middle section of each polymer chain. One method for synthesizing amine-terminated polymethacrylates is disclosed in Haddleton et. al. *Macromolecules,* 1999, vol 32, 8732–8739. A polyimide synthesis utilizing an addition polymer derived oligo/polymeric monoamine is also disclosed in Hedrick et al, *Polymer,* 1995, vol 36, no 25, 4855–4866. These materials were developed specifically for microphase separation, an undesirable property for the hybrid polymers of the invention. An alternate method for generating an ABA triblock hybrid polymer is to react functionalized addition polymers with activated polyimides. For example, combining diamines with a stoichiometric excess of dianhydrides will produce an anhydride end-capped activated polyimide. This can be further reacted with a functionalized addition polymer that is terminated with a monoamine. Similarly, an amine end-capped activated polyimide could be reacted with a functionalized addition polymer that is terminated with an anhydride. One skilled in the art would realize that by controlling the size and properties of the polymer blocks one could develop useful materials for the invention. Another method for achieving this polymer architecture is to first prepare an end-functionalized activated polyimide with an initiator moiety suitable for subsequent use in a living radical polymerization, rather than a

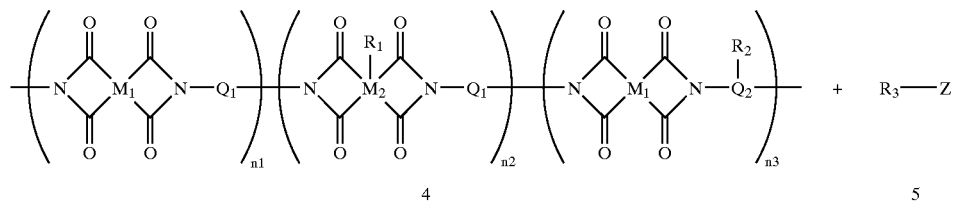

4          5

Where $M_1$ is a tetravalent organic group, $M_2$ is a pentavalent organic group, $Q_1$ is a divalent organic group optionally substituted with fluorine, chlorine, cyano, alkyl, fluoroalkyl alkoxy, alkylamino or diallylamino, $Q_2$ is a trivalent organic group optionally substituted with fluorine, chlorine, cyano, alkyl, fluoroalkyl, alkoxy, alkylamino or diallylamino, $R_1$, $R_2$ and $R_3$ are each a monovalent organic group which comprises a polymerization moiety, wherein $R_1$, $R_2$ and $R_3$ are at least one organic group independently selected from the group consisting of methacrylates and derivatives, acrylates and derivatives, methacrylamides and derivatives, acrylamides and derivatives, allyl groups and derivatives, vinyl groups and derivatives, styrenes and derivatives, maleimides or maleic anhydrides and derivatives and norbornenes and derivatives and Z is a monovalent organic group. n1 is 0–5000, n2 is 0–5000, n3 is from 0–5000 and n2+n3>0 and n1+n2+n3=3–5000. $R_1$, $R_2$, $R_3$, M1, M2, Q1, Q2 and Z can each independently represent a single chemical structure or a collection of distinct chemical structures.

The polymer architecture formed will be a branched copolymer and will show similar advantages to polymer formed by Method 1.

random polymerization. A general review on the theory of living radical polymerization is given in Kamigaito et al, *Chemical Reviews,* 2001, 101 3689–3745. The addition polymer can then be grown off the ends of the polyimide from the initiation moiety.

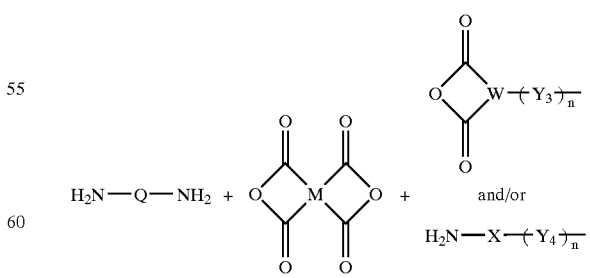

Where M is a tetravalent organic group, Q is a divalent organic group optionally substituted with fluorine, chlorine, cyano, alkyl, fluoroalkyl, alkoxy, alkylamino or diallylamino. W is a trivalent organic group, X is a covalent bond or a divalent organic group and $Y_3$ and $Y_4$ are each a divalent organic group representing the repeat unit of an addition polymer, and n is from 2–5000. M, W, X, Q, $Y_3$ and $Y_4$ can each independently represent a single chemical structure or a collection of distinct chemical structures.

Method 4:

A functionalized addition polymer that has one or more amine or anhydride groups is prepared. The functionalized addition polymer can then be polymerized with diamine and dianhydride monomers for the synthesis of hybrid polymers, as shown in the general formula below.

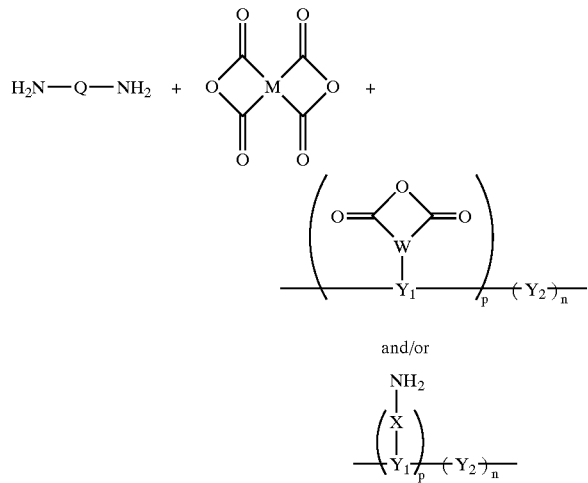

and/or

Where M is a tetravalent organic group, Q is a divalent organic group optionally substituted with fluorine, chlorine, cyano, alkyl, fluoroalkyl, alkoxy, alkylamino or diallylamino. W is a trivalent organic group, X is a covalent bond or a divalent organic group. $Y_1$ is a trivalent organic group representing the repeat unit of an addition polymer, $Y_2$ is a divalent organic group representing the repeat unit of an addition polymer, n is from 2–5000, and p is from 1–1000. M, W, X, Q, $Y_1$ and $Y_2$ can each independently represent a single chemical structure or a collection of distinct chemical structures. Although the figure for this method implies that monomers of dianhydrides and monomers of diamines are used in conjunction with the functionalized addition polymers to form hybrid polymers of the invention it is not meant to be limiting. For example, it is possible that with the appropriate ratios and reaction conditions that a hybrid polymer can be formed with monomers of diamines or dianhydrides, whichever is appropriate for the functionality of the functionalized addition polymer used in the formulation.

In one embodiment of this method, using a bis-end functionalized addition polymer, the hybrid polymer is referred to as a "segmented hybrid polymer", ABABABAB, where the "A" units represents segments of the addition polymer units and the "B" units represent polyimide segments. The synthesis of an addition polymer of styrene that is bis-end functionalized is described in Matyjaszewski et al, *Macromol. Rapid Commun.* 1997, vol 18, 1057–1066. The synthesis of amine or anhydride bis-end functionalized addition polymers, as would be useful for the synthesis of hybrid polymers of the invention, are not specifically described herein, however, one skilled in the art will realize that there are a variety of methods available for such chemical transformations. U.S. Pat. No. 4,539,342 describes the preparation of polyimide foams wherein diamines and dianhydrides or their equivalents are reacted with amine-terminated butadiene-nitrile copolymer, an example of an amine bis-end functionalized addition polymer. One who is skilled in the art will realize that by judicious choice of addition monomers and by controlling the size of the functionalized addition polymers one can avoid properties such as polyimide foam formation described for the amine-terminated butadiene-nitrile copolymer in U.S. Pat. No. 4,539,342.

In a second embodiment of this method, functionalized addition polymers or pre-functionalized addition polymers are prepared by randomly incorporating functionalized addition monomers or pre-functionalized addition monomers, respectively, into the backbone of an addition polymer. A pre-functionalized addition polymer can be modified to give a functionalized addition polymer. A functionalized addition polymer can be reacted with diamines and dianhydrides or their equivalents to give a poly(amic acid) polymer which can be chemically imidized to give a fully imidized, branched hybrid polymer. However, it is not a requirement of the invention that the hybrid polymer be partially or fully imidized. In addition, imidization, when desired, does not need to be performed chemically. Other methods of imidization, such as thermal imidization, are useful for the hybrid polymers of the invention.

In a third embodiment of this method, functionalized addition polymers can be reacted with activated polyimides to give a hybrid polymer. For example, combining diamines with a stoichiometric excess of dianhydrides will produce an anhydride end-capped activated polyimide. This can be further reacted with a functionalized addition polymer having amine groups to give a hybrid polymer of the invention. Similarly, an amine end-capped activated polyimide can be reacted with a functionalized addition polymer that has anhydride groups.

One skilled in the art will realize that by adjusting the ratio of addition monomers to functionalized or pre-functionalized addition monomers and by controlling the reaction conditions one can control the number of functional moieties on the final functionalized addition polymer as well as its molecular weight. A wide range of addition monomers can be used to prepare the functionalized addition polymers of the invention.

Preferred functionalized addition polymers of the invention are prepared from methacrylates and derivatives, acrylates and derivatives, methacrylamides and derivatives, actylamides and derivatives, olefins and derivatives, vinyls and derivatives, styrenes and derivatives, maleimides and derivatives and norbornenes and derivatives or mixtures thereof. Preferred functionalized addition polymers of the invention are between 500–150,000 molecular weight. Most preferred functionalized addition polymers of the invention are between 1000–90,000 molecular weight. Preferred functionalized addition polymers of the invention are prepared with 0.1%–20% functionalized or pre-functionalized addition monomers. Most preferred functionalized addition polymers of the invention are prepared with 1%–10% functionalized or pre-functionalized addition monomers.

Hybrid polymers of the invention prepared by Method 1 and Method 2 are prepared by performing an addition polymerization on a activated polyimide. Hybrid polymers prepared by Method 4 are prepared by condensing a functionalized addition polymer with diamines, dianhydrides or activated polyimides. Depending on the application of the final hybrid polymer, moieties that conflict with one but not both polymerizations can be incorporated by the careful design of the process. The method used for the formation of the hybrid polymers of the invention can be selected based on the specific requirements of the starting monomers and polymers used in the synthesis and the desired final properties.

Method 5:

A functionalized addition polymer that is terminated with a diamine or dianhydride is prepared. Preparation of such a material can be carried out by using appropriately functionalized initiator or endgroup termination reactions using the general procedures outlined in Coessens et al, *Progress in Polymer Science,* 2001, vol 26, 337–377. The diamine or dianhydride on the functionalized addition polymer can then be polymerized with diamine and dianhydride monomers for the synthesis of hybrid polymers of the invention. The hybrid polymer of this mode is termed a "comb hybrid polymer" where the backbone of the "comb" is the polyimide and the "tines" of the comb are the addition polymer segments.

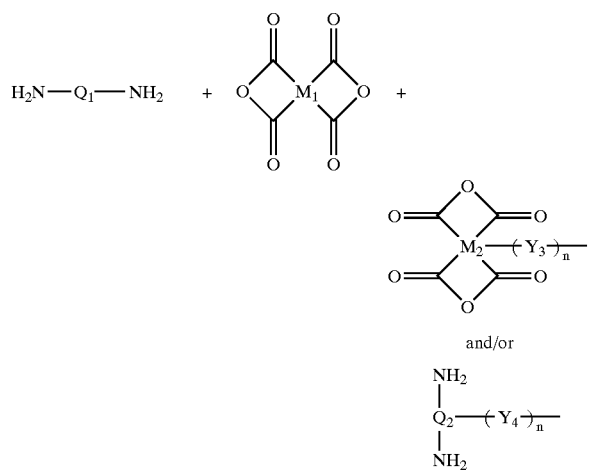

Where $M_1$ is a tetravalent organic group, $M_2$ is a pentavalent organic group, $Q_1$ is a divalent organic group optionally substituted with fluorine, chlorine, cyano, alkyl, fluoroalkyl alkoxy, alkylamino or diallylamino and $Q_2$ is a trivalent organic group optionally substituted with fluorine, chlorine, cyano, alkyl, fluoroalkyl, alkoxy, alkylamino or diallylamino. $Y_3$ and $Y_4$ are each a divalent organic group representing the repeat unit of an addition polymer and n is from 2–5000. $M_1$, $M_2$, $Q_1$, $Q_2$ $Y_3$ and $Y_4$ can each independently represent a single chemical structure or a collection of distinct chemical structures. Although the figure for this method implies that monomers of dianhydrides and monomers of diamines are used in conjunction with the functional addition polymers to form hybrid polymers of the invention it is not meant to be limiting. For example, it is possible that with the appropriate ratios and reaction conditions that a hybrid polymer can be formed with monomers of diamines or dianhydrides, whichever is appropriate for the functionality of the functionalized addition polymer used in the formulation.

An alternate method for generating a comb hybrid polymer is to react functionalized addition polymers with activated polyimides. For example, combining diamines with a stoichiometric excess of dianhydrides will produce an anhydride end-capped activated polyimide. This can be further reacted with a functionalized addition polymer that is terminated with a diamine. Similarly, an amine end-capped activated polyimide could be reacted with a functionalized addition polymer that is terminated with an dianhydride.

Another method for preparing the comb hybrid polymer of Method 5 is to first prepare a diamine or dianhydride containing an initiator moiety suitable for subsequent use in a living radical polymerization. The diamine or dianhydride is then incorporated into a activated polyimide using a chosen mixture of diamines and dianhydrides selected for desired properties and molecular weight. The addition polymer can then be grown off the sidechain(s) of the activated polyimide from the initiation moiety. The preparation of a variety of comb polymers using this method is described in Matyjaszewski et al., *Chemical Reviews,* 2001, vol 101, 2921–2990. The preparation of comb polymers incorporating polyimides, an embodiment of this invention, has not been described in Matyjaszewski et al or elsewhere in the literature.

To prepare the optical alignment layers the hybrid polymer solutions are coated onto desired substrates. Usually, for testing purposes, the substrates have a patterned indium-tin-oxide transparent electrode. Coating is usually accomplished with 1 to 30 wt % solids. Any conventional method may be used to coat the substrates including brushing, spraying, spin-casting, meniscus coating, dipping or printing. The preferred techniques for coating substrates demonstrated in the Examples are spinning and printing. However, the optical alignment materials of the invention are not limited to use in printing or spinning processes.

The coated substrates can be used as is ("uncured" or "undryed") or heated before processing. When heating is performed, the substrates are heated in an oven in air or under an inert atmosphere, for instance nitrogen or argon, at elevated temperatures usually not exceeding 300° C. and preferably at or below 180° C. for about from 0.25 to 12 hours, preferably for about 2 hours or less. The heating process removes the solvent carrier and may be used to further cure the polymer. For instance, in hybrid polymers where one component is a poly(amic acid) polymer the films can be thermally cured to imidize the poly(amic acid) portion to a polyimide.

The concentration of polymer and choice of solvents can affect the optical alignment quality, pretilt and voltage holding ratio (VHR). These choices affect the film thickness and how the film forms on the substrate, which can lead to differences in alignment quality, pretilt and VHR.

The optical alignment layers are exposed to polarized light to induce alignment of liquid crystals. By "polarized light" is meant light that is elliptically and/or partially polarized such that the light is more polarized along one axis (referred to as the major axis) versus the orthogonal axis (referred to as the minor axis). In this invention the polarized light has one or more wavelengths of about from 150 to 2000 nm and preferably of about from 150 and 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps, microwave excited lamps and black lights in combination with a polarizer. Polarizers useful in generating polarized light from nonpolarized light sources are interference polarizers made from dielectric stacks, absorptive polarizers, diffraction gratings and reflective polarizers based on Brewster reflection. With lower power lasers or when aligning small alignment regions, it may be necessary to focus the light beam onto the optical alignment layer.

By "exposing" is meant that polarized light is applied to the entire optical alignment layer or to a portion thereof. The light beam may be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium. Exposing can be accomplished by polarized light transmitted through at least one mask having a pattern or with a beam of polarized light scanned in a pattern. Exposing may be accomplished using interference of coherent optical beams forming patterns.

Exposing also can consist of two or more exposure steps wherein the conditions of each step such as angle of incidence, polarization state, energy density, and wavelength are changed. At least one of the steps must consist of exposure with polarized light. Exposures can also be localized to regions much smaller than the substrate size to sizes comparable to the entire substrate size.

Exposure energy requirements vary with the formulation and processing of the optical alignment layer prior and during exposure. A preferred range of exposure energy is about from 0.001 to 100 $J/cm^2$ and most preferred range of exposure energy is about from 0.001 to 5 $J/cm^2$. Lower exposure energy is most useful in large scale manufacturing of optical alignment layers and liquid crystal display elements. Lower exposure energy also minimizes the risk of damage to other materials on the substrates.

The quality of alignment and electrical properties of the liquid crystal cell assembled from exposed substrates can be improved by heating the substrates during exposure and/or after exposure but prior to assembly and/or filling of the cell. This additional heating of the substrates is not a requirement of the process but can give beneficial results.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell, injection filling and casting of a liquid crystal medium onto an optical alignment layer. Optical alignment layers are pre-exposed to polarized light or they are exposed after contacting the liquid crystal medium.

The type of photochemistry that occurs and the molecular structure of the liquid crystal determines the alignment direction of the liquid crystal medium. The alignment of the liquid crystal medium is often described relative to the dominant polarization of the polarized light in the plane of the optical alignment layer during exposure of the coated substrates. The liquid crystal medium is said to align "parallel" or "perpendicular" when the liquid crystal molecules are found to align predominately parallel or perpendicular to the dominant polarization of the light in the plane of the coated substrates, respectively. Another class of alignment is homeotropic where the liquid crystal molecules align predominantly perpendicular to the alignment layer. Several photochemical mechanisms are possible in many hybrid polymers and the predominant ones can be determined by film forming and exposure conditions (e.g., the temperature and atmosphere the films are exposed to prior to exposure, the temperature and atmosphere under which the exposure is performed, and the exposure energy density). The hybrid polymers can exhibit parallel, perpendicular or homeotropic alignment depending on which photochemical mechanism dominates and the liquid crystal molecular structure.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

Liquid crystal substances for use with liquid crystal optical elements include, nematic liquid crystal substances, ferroelectric liquid crystal substances, vertical alignment liquid crystals (negative dielectric liquid crystals), etc. Useful liquid crystals for the invention described herein include positive dielectric liquid crystals including 4-cyano-4'-alkylbiphenyls, 4-cyano-4'-alkyloxybiphenyls, 4-alkyl-(4'-cyanophenyl)cyclohexanes, 4-alkyl-(4'cyanobiphenyl) cyclohexanes, 4-cyanophenyl-4'-alkylbenzoates, 4-cyanophenyl-4'alkyloxybenzoates, 4-alkyloxyphenyl-4'-cyanobenzoates, 4-alkylphenyl-4'alkylbenzoates, 1-(4'-alkylphenyl)-4-cyanopyrimidines, 1-(4'-alkyloxyphenyl)-4-cyanopyrimidines and 1-(4-cyanophenyl)-4-alkylpyrimidines. Other useful liquid crystals are new superfluorinated liquid crystals available from EM Industries, (Hawthrone NY) including the commercial materials: ZLI-5079, ZLI-5080, ZLI-5081, ZLI-5092, ZLI-4792, ZLI-1828, MLC-2016, MLC-2019, MLC-6252 and MLC-6043. Other useful nematic materials for practicing the invention include the commercial liquid crystals available from Dinippon Ink and Chemicals, Inc. (Tokyo, Japan) including the DLC series: 22111, 22112, 22121, 22122, 23070, 23170, 23080, 23180, 42111, 42112, 42122, 43001, 43002, 43003, 63001, 63002, 63003, 63004, and 63005.

Polymerizable liquid crystal monomers also are useful in the invention. Preferred are those disclosed in U.S. Pat. No. 5,846,452, hereby incorporated by reference. The invention is not limited to the use of liquid crystals defined above. One skilled in the art will recognize that the invention will be of value with many diverse liquid crystal structures and formulations containing mixtures of liquid crystals.

The exposed optical alignment layer induces alignment of a liquid crystal medium at an angle with respect to the major axis of the polarization of the incident light beam and along the surface of the optical alignment layer. One skilled in the art will recognize that the process allows control of the alignment of a liquid crystal medium in any desired direction in and out of the plane of the optical alignment layer by controlling the conditions of the polarized light exposure.

A liquid crystal display element of the invention is composed of an electrode substrate having at least one hybrid polymer optical alignment layer of the invention, a voltage-impressing means and a liquid crystal material. FIG. 1 illustrates a typical liquid crystal display element, comprising a transparent electrode 2 of ITO (indium-tin oxide) or tin oxide on a substrate 1 and optical alignment layers 3 formed thereon. The optical alignment layers are exposed to polarized light of a wavelength or wavelengths within the absorption band of the anisotropically absorbing molecules. A spacer concurrently with a sealing resin 4 is intervened between a pair of optical alignment layers 3. A liquid crystal 5 is applied by capillary filling of the cell and the cell is sealed to construct a liquid crystal display element. Substrate 1 may comprise an overcoat film such as an insulating film, a color filter, a color filter overcoat, a laminated polarizing film etc. These coatings and films are all considered part of the substrate 1. Further, active elements such as thin film transistors, a nonlinear resistant element, etc. may also be formed on the substrate 1. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

Optical alignment layers of the invention are compatible with all liquid crystal display modes. A liquid crystal display element of the invention can comprise a variety of display configurations including twisted nematic, super twisted nematic, in-plane-switching, vertical alignment, active-matrix, cholesteric, polymer dispersed, ferroelectric, anti-ferroelectric and multi-domain liquid crystal displays. Although the display modes demonstrated in this specification are primarily twisted nematic and ferroelectric, the optical alignment layers of the invention are not limited to use in twisted nematic liquid crystal or ferroelectric displays.

Optical alignment layers of the invention are useful in many other liquid crystal devices other than liquid crystal displays. These include electro-optical light modulators, all-optical light modulators, erasable read/write optical data storage media; diffractive optical components such as gratings, beamsplitters, lenses (e.g., Fresnel lenses), passive imaging systems, Fourier processors, optical disc and radiation collimators; binary optical devices formed by combining refractive and diffractive optics including eyeglasses, cameras, night vision goggles, robotic vision and three-dimensional image viewing devices; and holographic devices such as heads-up displays and optical scanners.

Voltage Holding Ratio (VHR) is a critical electrical parameter for liquid crystal displays. VHR is a measure of the LCDs ability to retain a voltage during the time between pixel updates (frame time). The type of liquid crystal, alignment layers and cell geometry can all affect the measured VHR value. In the examples to follow, liquid crystal test cells comprising soda-lime substrates with patterned indium-tin-oxide (ITO) transparent electrodes are described. The overlap of the electrodes was about 1 cm$^2$ after the test cell was assembled. Approximately 2–3 inch wire leads were attached to the patterned ITO electrodes using an ultrasonic solder iron after the test cell is assembled but prior to filling. The leads were attached to a VHR measurement system (Elsicon VHR-100 Voltage Holding Ratio Measurement System, Newark, Del.) using test clips after the cell was filled and annealed. The VHR for the examples was measured for a 20 msec frame time, 1 volt applied signal, at room temperature and 75° C.

The following Examples are meant to illustrate the invention and are not meant to be limiting:

EXAMPLE 1

The following example describes the synthesis of novel Addition Monomer 1 for use in the preparation of hybrid polymers of the invention.

3-[4-(6-Hydroxy-hexyloxy)-phenyl]-acrylic acid methyl ester

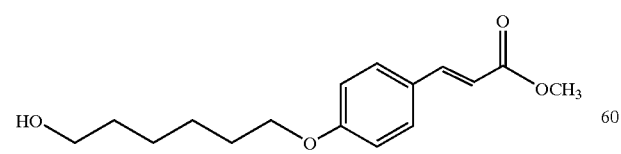

Methyl 4-hydroxy cinnamate (40 g, 225 mmol) was dissolved in 300 ml of NMP. 6-Chlorohexanol (269 mmol, 36.8 g), anhydrous potassium carbonate (37.2 g, 269 mmol) and a catalytic amount of potassium iodide were added. The batch was stirred at 90° C. for 32 hours. Water was added to the cooled solution, which was subsequently extracted with 3×200 mls of ethyl acetate. The combined organics were washed with 10% KOH (2×100 mls), brine solution and then dried over magnesium sulfate. The concentrated product was then recrystallized from a 1:1 mixture of ethyl acetate/hexane to give 45 g (72% yield) of an off-white solid.

2-Methyl-acrylic acid 6-[4-(2-methoxycarbonyl-vinyl)-phenoxy]-hexyl ester, Addition Monomer 1

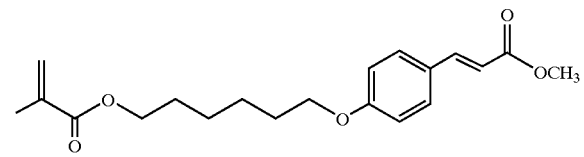

To an ice-cooled solution of 20 g (72 mmol) 3-[4-(6-hydroxy-hexyloxy)-phenyl]-acrylic acid methyl ester, 11.7 g (116 mmol) triethylamine and 4 crystals of BHT in 150 ml of dichloromethane was added dropwise 11.3 g (108 mmol) of methacryloyl chloride in 5 ml dichloromethane. The mixture was allowed to react for 2 hours, at which time the dichloromethane was removed under reduced pressure. The mixture was partitioned between water (100 ml) and ethyl acetate (100 ml) and the aqueous layer subsequently extracted twice more with 100 ml portions of ethyl acetate. The combined organic layers were washed with 100 ml portions of 1M HCl, water, 5% sodium hydrogen carbonate and brine and then dried with magnesium sulfate and concentrated. Recrystallization from ethanol gave 18 g (72% yield) of a white solid.

H$^1$ NMR (CDCl$_3$): 7.65 (d, 1H, J=16 Hz), 7.47 (dd, 2H, J=2.1, 6.4 Hz), 6.89 (dd, 2H, J=1.9, 6.6 Hz), 6.30 (d, 1H, J=15.7 Hz), 6.1 (m, 1H), 5.56 (m, 1H), 4.17 (m, 2H), 4.00 (m, 2H), 3.80 (s, 3H), 1.95 (m, 3H), 1.8–1.4 (m, 8H).

EXAMPLE 2

The following example describes the synthesis of novel Addition Monomer 2 for use in the preparation of hybrid polymers of the invention.

3-(4-Hydroxy-phenyl)-acrylic acid hexadecyl ester

4-Hydroxy cinnamic acid (10 g, 61 mmol) was combined with 1-hexadecanol (14.0 g, 58 mmol), p-toluenesulfonic acid (1.2 g, 6.3 mmol) and 100 ml toluene and heated to 140° C. for 24 h with continual removal of water using a Dean-Stark distillation apparatus. The mixture was cooled to room temperature and 50 ml ethyl acetate added. The solution was washed with water, 5% sodium hydrogen carbonate, brine and then dried over magnesium sulfate. The product was recrystallized from ethyl acetate to give 4.8 g 3-(4-hydroxy-phenyl)-acrylic acid hexadecyl ester.

3-[4-(6-Hydroxy-hexyloxy)-phenyl]-acrylic acid hexadecyl ester

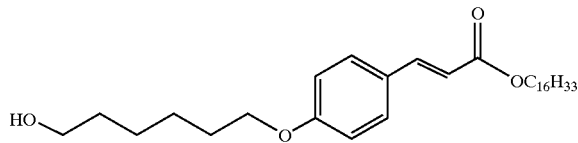

3-(4-Hydroxy-phenyl)-acrylic acid hexadecyl ester (4.8 g, 12.4 mmol) was dissolved in 100 ml of NMP. To this was added 6-chlorohexanol (2.19 g, 16 mmol), anhydrous potassium carbonate (1.7 g, 12 mmol) and a catalytic amount of potassium iodide. The reaction was stirred at 90° C. for 18 hours. Water was added to the cooled solution, which was subsequently extracted with 3×100 mls of ethyl acetate. The combined organics were washed with water (2×100 mls), water/brine (100 ml, 50:50) and brine solution and then dried over magnesium sulfate. The concentrated product was purified by silica gel chromatography eluting with 25% ethyl acetate in hexane to give 2.6 g white solid.

2-Methyl-acrylic acid 6-[4-(2-hexadecyloxycarbonyl-vinyl)-phenoxy]-hexyl ester, Addition Monomer 2

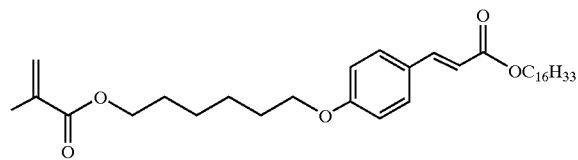

To an ice-cooled solution of 3-[4-(6-hydroxy-hexyloxy)-phenyl]-acrylic acid hexadecyl ester (2.6 g, 5.3 mmol), triethylamine (0.99 ml, 7.4 mmol) and 4 crystals of BHT in tetrahydrofuran (30 ml) was added dropwise methacryloyl chloride (0.68 g, 6.9 mmol). The reaction mixture was allowed to react for 7.5 hours, warming to room temperature. Potassium hydroxide solution (5 wt %, 50 ml) was added and the solution extracted 3×100 ml ethyl acetate. The combined organic layers were washed with 100 ml portions of 1M HCl, water, brine and then dried with magnesium sulfate and concentrated. The crude product was purified by silica gel chromatography eluting with 10% ethyl acetate in hexane, followed by recrystallization from hexane, to give 0.37 g white solid, 95% pure by HPLC. H¹ NMR (CDCl₃): 7.65 (d, 1H, J=16 Hz), 7.49 (d, 2H, J=8.7 Hz), 6.90 (d, 2H, J=8.8 Hz), 6.33 (d, 1H, J=15.8 Hz), 6.12 (m, 1H), 5.57 (m, 1H), 4.19 (m, 4H), 4.00 (m, 2H), 1.96 (m, 3H), 1.8–1.4 (m, 8H), 1.28 (s, 32H), 0.90 (vt, 3H).

EXAMPLE 3

The following example describes the synthesis of novel Addition Monomer 3 for use in the preparation of hybrid polymers of the invention.

4-(6-Hydroxy-hexyloxy)-benzaldehyde

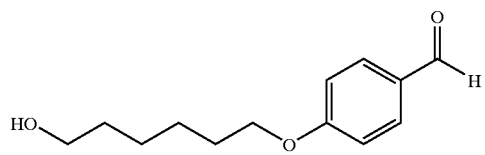

4-Hydroxybenzaldehyde (15 g, 122 mmol) was dissolved in 150 ml of NMP. 6-Chlorohexanol (20.16 g 146 mmol), anhydrous potassium carbonate (20.36 g, 146 mmol) and a catalytic amount of potassium iodide were added. The batch was stirred at 90 C for 24 hours. Water was added to the cooled solution, which was subsequently extracted with 3×100 mls of ethyl acetate. The combined organics were washed with 5% KOH (2×100 mls), brine solution and then dried over magnesium sulfate. The concentrated product was then recrystallized from a 1:1 mixture of ethyl acetate/hexane to give 14 g of an off-white solid.

3-[4-(6-Hydroxy-hexyloxy)-phenyl]-1-(4-iodo-phenyl)-propenone

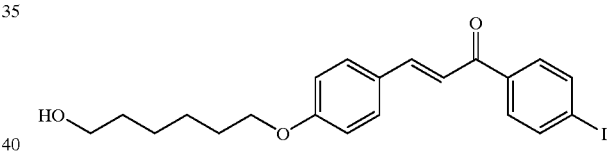

4-Iodoacetophenone (2.46 g, 10 mmol) was dissolved in 20 ml toluene. 4-(6-Hydroxyhexyloxy)benzaldehyde (10 mmol, 2.22 g), potassium hydroxide (15 mmol, 0.84 g in 4 ml water) and Aliquat 336 (0.2 g) were added and the mixture stirred vigorously for 1 h. The formed precipitate was filtered, washed with water and toluene and dried under vacuum, yielding 1.9 g product.

3-[4-(6-Hydroxy-hexyloxy)-phenyl]-1-(4-tridecafluorohexyl-phenyl)-propenone

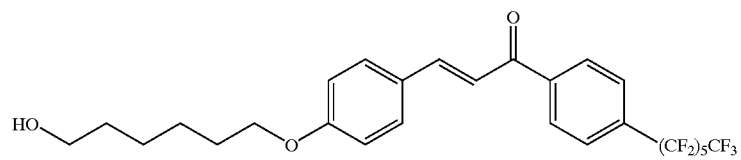

To a solution 3-[4-(6-hydroxy-hexyloxy)-phenyl]-1-(4-iodo-phenyl)-propenone (1.9 g, 4.22 mmol) in anhydrous DMSO (10 mL) was added copper powder (0.67 g, 10.55 mmol), perfluorohexyl iodide (2.35 g, 5.28 mmol) and a catalytic amount of iodine. The reaction mixture was heated to 105° C. for 24 h, cooled, combined with 100 ml water and 50 ml ethyl acetate and filtered to remove insoluble copper salts. The organic and aqueous layers in the filtrate were separated, and the aqueous layer extracted with ethyl acetate. The combined organics were washed with water and brine, dried over MgSO$_4$ and concentrated. Recrystallization from 25% ethyl acetate in hexane gave 1.6 g of product.

2-Methyl-acrylic acid 6-{4-[3-oxo-3-(4-tridecafluorohexyl-phenyl)-propenyl]-phenoxy}-hexyl ester, Addition Monomer 3

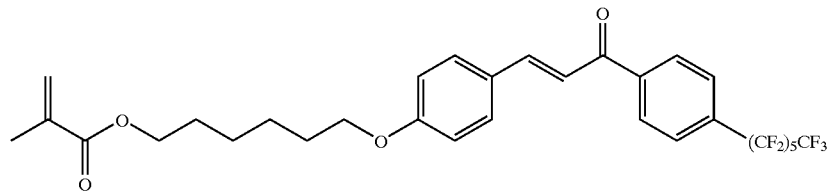

To an ice-cooled solution of 3-[4-(6-hydroxy-hexyloxy)-phenyl]-1-(4-tridecafluorohexyl-phenyl)-propenone (2.3 g, 3.58 mmol), triethylamine (0.58 g, 5.73 mmol) and 4 crystals of BHT in 20 ml of dichloromethane was added dropwise, methacryloyl chloride (0.56 g, 5.73 mmol) in 5 ml dichloromethane. The mixture was allowed to react for 1 hour, at which time the dichloromethane was removed under reduced pressure. The mixture was partitioned between water (50 ml) and ethyl acetate (50 ml) and the aqueous layer subsequently extracted twice more with 50 ml portions of ethyl acetate. The combined organic layers were washed with 50 ml portions of 1M HCl, water, 5% sodium hydrogen carbonate and brine and then dried with magnesium sulfate and concentrated. Recrystallization from ethyl acetate gave 1.2 g of product. H$^1$ NMR (CDCl$_3$): 8.12 (d, 2H, J=10.5 Hz), 7.82 (d, 1H, J=15.8 Hz), 7.74 (d, 2H, J=8.4 Hz), 7.61 (d, 2H, J=8.9 Hz), 7.38 (d, 1H, J=15.5 Hz), 6.94 (d, 2H, J=8.9 Hz), 6.10 (s, 1H), 5.55 (m, 1H), 4.17 (m, 2H), 4.02 (m, 2H), 1.95 (m, 3H), 1.4–1.9 (m, 8H).

EXAMPLE 4

The following example describes the synthesis of novel Addition Monomer 4 for use in the preparation of hybrid polymers of the invention.

1-[4-(6-Hydroxy-hexyloxy)-phenyl]-3-phenyl-propenone

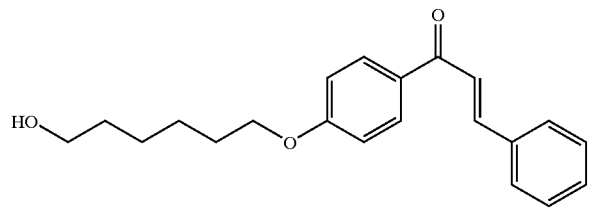

4'-Hydroxychalcone (15 g, 67 mmol) was dissolved in 150 ml of NMP. 6-Chlorohexanol (13.72 g, 100 mmol), anhydrous potassium carbonate (9.24 g, 67 mmol) and a catalytic amount of potassium iodide were added. The batch was stirred at 90° C. for 27 hours. Water was added to the cooled solution, which was subsequently extracted with 3×100 mls of ethyl acetate. The combined organics were washed with 5% NaOH (2×100 mls), water and brine solution and then dried over magnesium sulfate. The ethyl acetate solution was partially concentrated and then cooled to crystallize out the product, yielding 17.5 g of white solid.

2-Methyl-acrylic acid 6-[4-(3-phenyl-acryloyl)-phenoxy]-hexyl ester, Addition Monomer 4

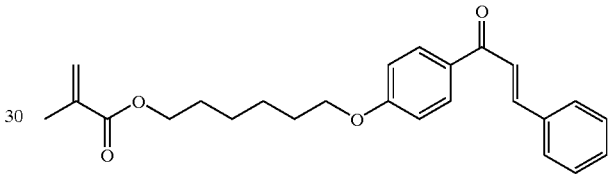

To an ice-cooled solution of 1-[4-(6-hydroxy-hexyloxy)-phenyl]-3-phenyl-propenone (9.75 g, 30 mmol), triethylamine (4.6 g, 45 mmol) and 4 crystals of BHT in 20 ml of dichloromethane was added dropwise methacryloyl chloride (4.75 g, 45 mmol) in 5 ml dichloromethane. The reaction mixture was allowed to react for 2 hours, at which time the dichloromethane was removed under reduced pressure. The mixture was partioned between water (100 ml) and ethyl acetate (100 ml) and the aqueous layer subsequently extracted twice more with 100 ml portions of ethyl acetate. The combined organic layers were washed with 2×50 ml portions of 1M HCl and 5% sodium hydrogen carbonate, 50 ml portions of water and brine and then dried with magnesium sulfate and concentrated. Recrystallization from 40% ethyl acetate in hexane gave 3.45 g of a white solid. H$^1$ NMR (CDCl$_3$): 8.04 (d, 2H, J=8.0 Hz), 7.82 (d, 1H, J=15 Hz), 7.65 (m, 2H), 7.56 (d, 1H, J=16.5 Hz), 7.42 (m, 3H), 6.97 (d, 2H, J=8.1 Hz), 6.11 (m, 1H), 5.56 (m, 1H), 4.18 (m, 2H), 4.06 (m, 2H), 1.95 (s, 3H), 1.8–1.4 (m, 8H).

EXAMPLE 5

The following example describes the preparation of Addition Monomer 5, for use in the preparation of hybrid polymers of the invention.

2-Methyl-acrylic acid 2-[4-(2-methoxycarbonyl-vinyl)-phenoxy]-ethyl ester, Addition Monomer 5

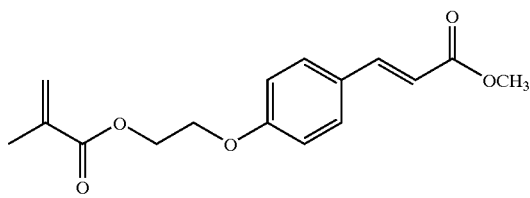

To a ice cooled solution of methyl 4-hydroxy cinnamate (5.0 g, 28 mmol) in anhydrous tetrahydrofuran (50 ml), triphenylphosphine (7.73 g, 30 mmol) and diethyl azodicarboxylate (5.13 g, 30 mmol) was slowly added 2-hydroxy methacrylate (4.02 g, 31 mmol) in 10 ml tetrahydrofuran. The reaction was stirred at room temperature, under nitrogen, for 18 h. Water (100 ml) was added and the solution was extracted into ethyl acetate (3×100 ml). The combined ethyl acetate extracts were washed with 5% KOH (3×50 ml), water (100 ml) and brine (100 mL). After drying over magnesium sulfate and concentrating, the crude material was purified by first using silica gel chromatography, eluting with 20% ethyl acetate in hexane, and then recrystallizing from 50 ml 20% ethyl acetate in hexane, giving 4.4 g of white crystals, >99% pure by HPLC. $H^1$ NMR (CDCl$_3$): 7.66 (d, 1H, J=16 Hz), 7.48 (d, 2H, J=8.7 Hz), 6.92 (d, 2H, J=8.8 Hz), 6.32 (d, 1H, J=16 Hz), 6.14 (m, 1H), 5.60 (m, 1H), 4.51 (m, 2H), 4.25 (m, 2H), 3.80 (s, 3H), 1.95 (m, 3H).

EXAMPLE 6

The following example describes the synthesis of a novel Addition Monomer 6 useful in the preparation of hybrid polymers.

4-Heptadecafluorooctyl-phenol

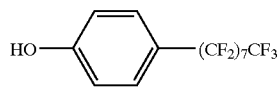

To a solution of acetic acid 4-iodo-phenyl ester (9 gm, 0.0366 mol) in anhydrous DMSO (75 mL) was added copper powder (5.8 g, 0.091 mol), perfluorooctyl iodide (25 g, 0.046 mol) and iodine (130 mg). The reaction mixture was heated to 105° C. for 18 hr, cooled, combined with 100 ml water and 50 ml ether and filtered to remove insoluble copper salts. The organic and aqueous layers in the filtrate were separated, and the aqueous layer extracted twice with ether (2×100 mL). The combined organics were washed with water and brine, dried over MgSO$_4$, and concentrated. To a solution of the crude product in 50 mL methanol was added 1.5 mL 10N HCl. The mixture was refluxed on a steam bath for 1 hr to hydrolyze the acetate completely to the phenol. After cooling to room temperature, the reaction mixture was poured into a separatory funnel containing 100 mL water, and extracted with ether (3×75 mL). The combined organics were washed with water and brine and dried over MgSO$_4$. Recrystallization of the crude concentrate gave 12.5 g of the phenol at 99% purity by HPLC as a waxy solid mp 63–68° C.

2-Methyl-acrylic acid 6-[4-(2-carboxy-vinyl)-phenoxy]-hexyl ester

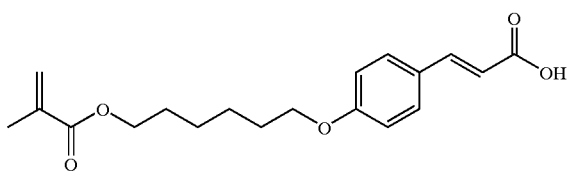

To an ice-cooled solution of 3-[4-(6-hydroxy-hexyloxy)-phenyl]-acrylic acid (4.1 gm, 15.5 mmol, see Example 1), triethylamine (4.08 gm, 40 mmol) and BHT (a few crystals) in 40 ml of dichloromethane was added dropwise methacryloyl chloride (4.05 gm, 39 mmol) in 5 ml dichloromethane. The reaction mixture was allowed to react for 2 hours, at which time the dichloromethane was removed under reduced pressure. The mixture was partitioned between 1M HCl (100 ml) and ethyl acetate (75 ml) and the aqueous layer subsequently extracted twice more with 75 ml portions of ethyl acetate. The combined organic layers were washed with 100 ml portions 5% sodium hydrogen carbonate and brine and then dried with magnesium sulfate and concentrated to give 5 gm of a white solid. The anhydride (3.2 g) was hydrolyzed to the acid by dissolving in acetone (40 ml) and treating with 10 ml of 10% sodium hydroxide. The acidified solution was filtered, and the solid dried under vacuum overnight to give 1.7 g white solid.

2-Methyl-acrylic acid 6-{4-[2-(4-tridecafluorohexyl-phenoxycarbonyl)-vinyl]-phenoxy}-hexyl ester, Addition Monomer 6

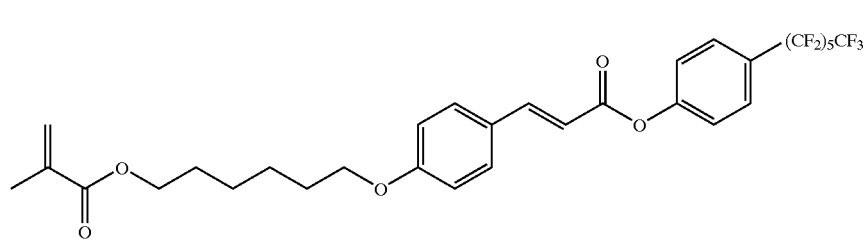

2-Methyl-acrylic acid 6-[4-(2-carboxy-vinyl)-phenoxy]-hexyl ester (1.0 g, 3 mmol), 4-heptadecafluorooctyl-phenol (1.36 gm, 3.3 mmol) and dimethylaminopyridine (0.29 gm, 2.4 mmol) were dissolved in 10 ml of dichloromethane and cooled in an ice bath. To this was added dicyclohexylcarbodiimide (0.68 g, 3.3 mmol). The solution was allowed to react for 4 h, at which time the dichloromethane was removed under reduced pressure. The mixture was dissolved in ethyl acetate (50 ml) and filtered. The ethyl acetate was washed with 1M HCl (2×20 ml), water (2×20 ml), 5% NaOH (2×20 ml) and brine and then dried with magnesium sulfate and concentrated. Recrystallization from 15% ethyl acetate in hexane gave 1.25 g of product. H$^1$ NMR (CDCl$_3$): 7.85 (d, 1H, J=15.8 Hz), 7.65 (d, 2H, J=8.5 Hz), 7.55 (d, 2H, J=8.9 Hz), 7.35 (d, 2H, J=8.7 Hz), 6.94 (d, 2H, J=8.9 Hz), 6.50 (d, 1H, J=16.1 Hz), 6.1 (m, 1H), 5.56 (m, 1H), 4.17 (m, 2H), 4.00 (m, 2H), 1.95 (m, 3H), 1.9–1.4 (m, 8H).

EXAMPLE 7

The following example describes the synthesis of novel Pre-Functionalized Addition Monomer 1 used in the preparation of functionalized addition polymers.

(4-Vinyl-phenyl)-carbamic acid tert-butyl ester, Pre-Functionalized Addition Monomer 1

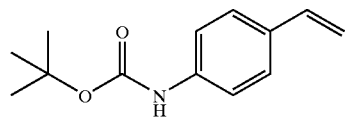

To an ice cooled solution of 4-vinyl aniline (4 g, 33.6 mmol), triethylamine (3.72 g, 36.8 mmol) and 5 crystals of BHT in anhydrous tetrahydrofuran (40 ml) was added solid di-tertbutyldicarbonate (8.0 g, 36.7 mmol). The reaction was stirred at room temperature for 17.5 h, at which time 100 ml of 1 M HCl was added and the solution extracted with 3×100 ml ethyl acetate. The combined organic layers were washed with 100 ml portions of water, 5% sodium hydrogen carbonate, water and brine and then dried with magnesium sulfate and concentrated. The material was recrystallized using 10% ethyl acetate in hexane, filtering while hot to remove insoluble byproducts, to give 3.0 g white solid, >99% pure by HPLC. H$^1$ NMR (CDCl$_3$): 7.34 (s, 5H), 6.67 (dd, 1H, J=10.7, 17.5 Hz), 6.54 (bs, 1H), 5.67 (dd, 1H, J=1.0, 17.6 Hz), 5.18 (dd, 1H. J=1.0, 10.8 Hz), 1.53 (s, 9H).

EXAMPLE 8

The following example describes the two step synthesis of a novel, multi-amine Functionalized Addition Polymer 1 that is useful in the synthesis of hybrid polymers.

Pre-Functionalized Addition Polymer 1

A mixture of Addition Monomer 1 (3.602 g), Addition Monomer 3 (200.2 mg) and Pre-Functionalized Addition Monomer 1 (200.3 mg) was dissolved in 129.3 g dimethylformamide (DMF) containing 258 mg azobisisobutyronitrile (AIBN). The solution was degassed by three consecutive freeze-pump-thaw cycles, sealed under vacuum and then stirred at 60° C. for 16 h. The solvent was removed at reduced pressure (1 mmHg/30° C.) to 10 wt % and the residue was precipitated into 150 ml methanol. The precipitate was redissolved in DMF to 20 wt % and reprecipitated into 150 ml methanol twice more. Solvent was removed under vacuum at room temperature overnight, yielding 3.00 g solid (Mw 7,700). All reported molecular weights are determined by gel permeation chromatography (GPC) with a MiniMixD column (Polymer Labs, Inc, Amherst Mass.) relative to polyethylene oxide narrow molecular weight standards, eluting with mobile phase DMF/H$_3$PO$_4$/LiBr/THF (99/0.3/0.3/0.6), at 70° C.

Functionalized Addition Polymer 1

Pre-Functionalized Addition Polymer 1 (2.96 g) was dissolved in 15 ml of dichloromethane. A solution of trifluoroacetic acid (21.5 ml in 125 ml dichloromethane) was added and the reaction stirred for 2.5 h at room temperature under a nitrogen atmosphere. The reaction was cooled in an ice bath and methanol (1.5 L) was added. Triethylamine (75 ml) was added dropwise over 1.25 h. The solvent was decanted off and the polymer was dried under vacuum overnight at room temperature. The polymer was redissolved in DMF to 15 wt % and reprecipitated into 1% triethylamine in methanol (500 ml). The solvent was decanted off and the polymer was dried under vacuum for 3 h, redissolved in DMF to 15 wt % and precipitated for a third time in 500 ml methanol. The solvent was decanted off, the polymer was dried under vacuum for 30 min and then lyophilized from dioxane to give 0.84 g of Functionalized Addition Polymer 1, (Mw 9,700). Amine titration indicated 0.28 mmol amine/g polymer.

EXAMPLE 9

The following example describes the synthesis of novel Functionalized Addition Polymer 2 for use in the preparation of hybrid polymers of the invention.

Pre-Functionalized Addition Polymer 2

A mixture of 3.70 g of Addition Monomer 1, 198.8 mg of Addition Monomer 3 and 100.5 mg of Pre-Functionalized Addition Monomer 1 was dissolved in 76.0 g dimethylformamide (DMF) containing 76 mg azobisisobutyronitrile (AIBN). The solution was degassed by three consecutive freeze-pump-thaw cycles, sealed under vacuum and then stirred at 60° C. for 16 h. The solvent was removed at reduced pressure (1 mmHg/30° C.) to 10 wt % and the residue was precipitated into 150 ml methanol. The precipitate was redissolved in DMF and reprecipitated into methanol twice. Solvent was removed under vacuum at room temperature overnight, yielding 3.19 g solid (Mw 45,000).

Functionalized Addition Polymer 2

Pre-Functionalized Addition Polymer 2 (3.19 g) was dissolved in 16.6 ml of dichloromethane. A solution of trifluoroacetic acid (23.3 ml in 150 ml dichloromethane) was added and the reaction stirred for 2.5 h at room temperature under a nitrogen atmosphere. Methanol (1.5 L) was added and then triethylamine (83 ml) was added dropwise over 1 h. The solvent was decanted off and the polymer was dried under vacuum overnight at room temperature. The polymer was dissolved in DMF to 15 wt % and precipitated into 1% triethylamine in methanol (500 ml). The solvent was decanted off and the polymer was dried under vacuum, redissolved in DMF to 15 wt % and precipitated for a third time in 500 ml methanol. The solvent was decanted off and the polymer was dried under vacuum overnight at room temperature and then lyophilized from dioxane to give 2.24 g of Functionalized Addition Polymer 2 (Mw 54,000). Amine titration indicated 0.14 mmol amine/g polymer.

EXAMPLE 10

The following example describes the synthesis of novel Functionalized Addition Polymer 3 for use in the preparation of hybrid polymers of the invention.

Pre-Functionalized Addition Polymer 3

A mixture of 3.60 g of Addition Monomer 1, 200 mg of octadecyl methacrylate, and 200 mg of Pre-Functionalized Addition Monomer 1 was dissolved in 129.5 g dimethylformamide (DMF) containing 258 mg azobisisobutyronitrile (AIBN). The solution was degassed by four consecutive freeze-pump-thaw cycles, sealed under vacuum and then stirred at 60° C. for 18 h. The solvent was removed at reduced pressure (1 mmHg/30° C.) to 10 wt % and the residue was precipitated into 150 ml methanol. The precipitate was redissolved in DMF to 20 wt % and reprecipitated into 150 ml methanol twice. Solvent was removed under vacuum at room temperature overnight, yielding 2.98 g powder (Mw 8,800).

Functionalized Addition Polymer 3

Pre-Functionalized Addition Polymer 3 (2.95 g) was dissolved in 15 ml of dichloromethane. A solution of trifluoroacetic acid (21.5 ml in 125 ml dichloromethane) was added and the reaction stirred for 2.5 h at room temperature under a nitrogen atmosphere. Methanol (1.5 L) was added, and the reaction cooled in an external ice bath. Triethylamine (75 ml) was added dropwise over 1.25 h. The solvent was decanted off and the polymer was dried under vacuum overnight at room temperature. The polymer was dissolved in DMF to 20 wt % and precipitated into 250 ml methanol, then redissolved to 15 wt % and precipitated into methanol (250 ml containing 5 ml triethylamine). The solvent was decanted off and the polymer was dried under vacuum for 30 min, redissolved in DMF and precipitated again in 200 ml methanol. The solvent was decanted off and the polymer was dried under vacuum for 30 min at room temperature and then lyophilized from dioxane to give 0.79 g of Functionalized Addition Polymer 3. Amine titration indicated 0.27 mmol amine/g polymer.

EXAMPLE 11

The following example describes the novel synthesis of the diamine 1-[4-vinylphenoxy]-2,4-benzenediamine for use in the preparation of hybrid polymers of the invention.

Synthesis of 1-[4-vinylphenoxy]-2,4-dinitrobenzene

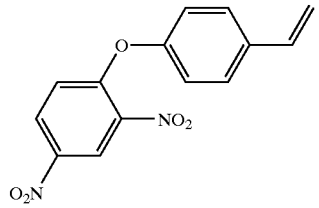

A mixture of 2,4-dinitrofluorobenzene (6.38 g, 34 mmol), 4-vinylphenol (4.32 g, 36 mmol), 4.97 g $K_2CO_3$ and 2–3 crystals of BHT inhibitor was dissolved in 75 ml NMP and stirred at 40° C. under nitrogen for 4 hr. The reaction mixture was poured into a separatory funnel containing 150 ml water and extracted 3×100 mls with ethyl acetate. The combined organics were washed with 100 ml 10% KOH, and brine, dried with anhydrous $MgSO_4$ and concentrated. The residue was recrystallized from 70% ethyl acetate in hexane yielding 9.5 g product.

1-[4-vinylphenoxy]-2,4-benzenediamine

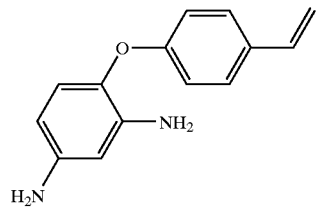

1-[4-Vinylphenoxy]-2,4-dinitrobenzene (9.0 g, 31 mmol) was dissolved in 100 ml ethanol/tetrahydrofuran (1:1). In succession, tin(II)chloride (70.9, 310 mmol), and 10N HCl (37.7 ml, 377 mmol) were added. The solution was stirred at room temperature 16 h. The reaction mixture was poured into a separatory funnel containing 150 ml ice-cold water followed by the addition of 20% KOH (ice-cold, 629 g). The mixture was extracted with ether (3×100 ml). The combined organic phases were washed with water (3×100 ml) and brine, dried with solid $MgSO_4$ and concentrated. Column chromotography yielded 4.5 g product. The product was crystallized from 40% ethyl acetate in hexane. $^1$H NMR ($CDCl_3$): 7.32 (d, 2H, J=8.5 Hz), 6.88 (d, 2H, J=8.6 Hz), 6.73 (d, 1H, J=8.3 Hz), 6.66 (dd, 1H, J=17.3, 11.9 Hz), 6.15 (d, 1H, J=2.9 Hz), 6.08 (dd, 1H, J=2.4, 8.2 Hz), 5.61 (dd, 1H, J=17.6 Hz, 0.8 Hz), 5.14 (d, 1H, J=10.9 Hz), 4.38 (br s, 4H).

EXAMPLE 12

The following example describes the synthesis of diamine N,N-dipropyl-benzene-1,2,4-triamine for use in the preparation of hybrid polymers of the invention.

(2,4-Dinitro-phenyl)-dipropyl-amine

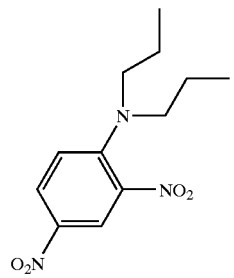

To an ice cooled solution of 2,4-dinitrofluorobenzene (9.3 g, 50 mmol) and $K_2CO_3$ (6.9 g, 50 mmol) in 40 ml NMP was added dropwise dipropylamine (6.07 g, 60 mmol) in 10 ml NMP. After stirring for 1 hr, the reaction mixture was poured into a separatory funnel containing 100 ml water and extracted 3×100 mls with ether. The combined organics were washed with 3×100 ml water, 100 ml brine, dried with anhydrous $MgSO_4$ and concentrated, giving 13.1 g crude product. This material was pure enough to carry on to the next step.

1N, 1N-Dipropyl-benzene-1,2,4-triamine

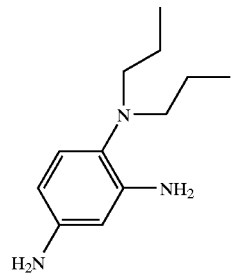

(2,4-Dinitro-phenyl)-dipropyl-amine (13.1 g, 49 mmol) was dissolved in 200 ml ethanol and cooled in an icebath. In succession, ION HCl (60 ml, 600 mmol) and tin(II)chloride (112.5, 499 mmol), were added. The solution was stirred at room temperature 16 h. The reaction mixture was poured into a separatory funnel containing 100 ml ice-cold water followed by the addition of 20% KOH (ice-cold, 1L). The mixture was extracted with ether (3×150 ml). The combined organic phases were washed with water (3×100 ml) and brine, dried with solid MgSO$_4$ and concentrated. Distillation (Krugel Rohr, 90°–100° C. at 0.2 mm Hg) followed by treatment with decolorizing charcoal and recrystallization from 15% ethyl acetate in hexane gave 8.0 g product >99% pure by HPLC.

EXAMPLE 13

The following example describes the synthesis of novel Activated Polyimide 1 for use in the preparation of hybrid polymers of the invention.

Activated Polyimide 1

N,N-Diallyl-1,2,4-benzenetriamine (5.284 g, 26 mmol) was dissolved in 41.28 g anhydrous NMP under nitrogen atmosphere. Solid 1,2,3,4-cyclobutanetetracarboxylic dianhydride (5.1048 g, 26 mmol) was added and the solution was stirred for 18 h at 21° C., becoming viscous. NMP (77.46 g) was added followed by a mixture of 7.96 g acetic anhydride and 3.38 g pyridine. The solution was stirred at 50° C. for 4 additional hours. The polyimide was precipitated into 600 ml methanol, collected and washed with additional portions of methanol. The solids were then dried under vacuum at room temperature overnight and at 60° C. for 6 h. This yielded 12.5 g product, containing approximately 76% solids (Mw 133,000).

EXAMPLE 14

The following example describes the synthesis of novel Activated Polyimide 2 for use in the preparation of hybrid polymers of the invention.

Activated Polyimide 2

1N,1N-Dipropyl-benzene-1,2,4-triamine (946.7 mg, 4.57 mmol) and 1-[4-vinylphenoxy]-2,4-benzenediamine (54.4 mg, 0.24 mmol) were dissolved in 7.76 g anhydrous NMP under nitrogen atmosphere. Solid 1,2,3,4-cyclobutanetetracarboxylic dianhydride (943.4 mg, 4.81 mmol) was added and the solution was stirred for 18 h at 21 C, becoming viscous. NMP (14.6 g) was added, followed by a mixture of 1.47 g acetic anhydride and 0.63 g pyridine. The solution was stirred at 50° C. for 4 additional hours. The polyimide was precipitated by addition to 400 ml methanol. The solid was washed with additional portions of methanol. Solvent was removed under vacuum (0.2 mmHg) at room temperature overnight, followed by 3 h at 60° C.

Yield 1.98 g (Mw 82,000).

EXAMPLE 15

The following example illustrates good quality alignment and pretilt in a novel hybrid polymer of the invention synthesized following Method 2, whereby the activated polyimide is functionalized by placing polymerizable allyl groups on the diamines. By using an addition monomer that contains an 18 carbon alkyl group, pre-tilt is demonstrated with the novel hybrid polymer of this example.

Hybrid Polymer 1

A mixture of Activated Polyimide 1 (3.10 g, nominally 2.35 g solids), Addition Monomer 1 (8.13 g) and octadecyl methacrylate (0.28 g) was dissolved in 364 g dimethylformamide (DMF) containing 364 mg azobisisobutyronitrile (AIBN). The solution was degassed by four consecutive freeze-pump-thaw cycles, sealed under vacuum and then stirred at 60° C. for 15.5 h. The solvent was removed at reduced pressure (1 mmHg/30° C.) to 19 wt % and the residue was precipitated into 600 ml toluene/methanol (3:2, v/v). The precipitate was redissolved in DMF to 12 wt % and reprecipitated into 600 ml toluene/methanol (3:2, v/v). The solids were collected and dried under vacuum at room temperature overnight and at 80° C. for 2 h, yielding 3.6 g solids (Mw 245,000).

A solution for spin-coating was prepared at 2% in γ-butyrolactone (BL). The following general procedure was also used to fabricate test cells for materials described in the following examples. Any exceptions to this procedure will be noted in the specific examples.

Two 0.9 inch by 1.2 inch by 1 millimeter thick soda lime glass substrates with transparent indium-tin-oxide (ITO) coatings (DCI, Inc. Lenexa, Kans. 66219) were spin-coated with 2 wt % hybrid polymer in BL. To aid in the wetting of the polymer, the substrates were heated to 85° C.–95° C. for three minutes immediately prior to spin coating. Spin coating was achieved by filtering the hybrid polymer solution through a 0.45 micron Teflon filter membrane onto the surface of the substrates. The substrates were spun at 2500 RPM for 1 minute to produce uniform thin films.

The substrates were then exposed to polarized ultraviolet (UV) light with a model OM-SEMT optics module (Elsicon, Inc., Newark, Del.) in an OptoAlign™ model E3-UV-600-A lamp exposure unit (Elsicon, Inc., Newark, Del.).

After exposure, the substrates were assembled with orthogonal orientation of the optically generated alignment direction. In this case, the alignment direction was assumed to be parallel. The cell thickness was about 4 microns. The cell was subsequently capillary filled with nematic liquid crystals suitable for active matrix liquid crystal displays. As expected, the liquid crystals were observed to align in a twisted nematic (TN) orientation when viewed between polarizers. Upon annealing the liquid crystal cell above the liquid crystal isotropic point (120° C. for 30 minutes), the uniformity of the alignment was observed to improve.

Pretilt was measured using the PAS-301 measurement system (Elsicon, Inc., Newark, Del.) and VHR was measured using the VHR-100 measurement system (Elsicon, Inc., Newark, Del.) for annealed TN cells manufactured with the novel hybrid polymers of these examples. For all examples, the ratings for alignment quality are given by the following scale:

• Excellent alignment, no flow effects, high uniformity.
o Good alignment, low flow effects, uniform.
Δ Fair alignment, flow effects, some nonuniformity (mottled or cloudy background).
X Poor alignment, severe flow effects, nonuniform.
+ Levels of improvement, Δ<Δ+<Δ++<o.

The resulting cell from substrates exposed with 0.5 J/cm² showed Δ++ alignment quality, −7 degrees pretilt and a VHR at 75° C. of 0.83.

EXAMPLE 16

The following example illustrates good quality alignment and pretilt in a novel hybrid polymer of the invention synthesized following Method 2. Changing the monomer feed ratio from Example 15 results in a hybrid polymer with increased pretilt values.

Hybrid Polymer 2

A mixture of Activated Polyimide 1 (4.47 g, nominally 3.15 g solids), Addition Monomer 1 (6.97 g) and octadecyl methacrylate (0.489 g) was dissolved in 267 g dimethylformamide (DMF) containing 267 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 17 wt % and the residue was precipitated into 600 ml toluene/methanol (3:2 v/v). The precipitate was redissolved in DMF to 11 wt % and reprecipitated into 600 ml toluene/methanol (3:2, v/v). The solids were collected and dried under vacuum at room temperature overnight yielding 5.54 g solids (Mw 293,000). A portion of the solids were dried for 2 h under vacuum at 80° C. before preparing a solution for spin-coating. The resulting cell from substrates exposed with 0.75 J/cm² showed Δ++ alignment quality, −17 degrees pretilt and a VHR at 75° C. of 0.87.

EXAMPLE 17

The following example illustrates good quality alignment and pretilt in a novel hybrid polymer of the invention synthesized following Method 2, whereby the activated polyimide is functionalized by placing polymerizable allyl groups on the diamines. By using an addition monomer that contains a 16 carbon alkyl group and a photoreactive cinnamate, pre-tilt is demonstrated with the novel hybrid polymer of this example.

Hybrid Polymer 3

A mixture of Activated Polyimide 1 (200 mg, nominally 168 mg), Addition Monomer 1 (570 mg) and Addition Monomer 2 (30 mg) was dissolved in 26 g dimethylformamide (DMF) containing 26 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 25 wt % and the residue was precipitated into 50 ml toluene/methanol (3:2 v/v). The precipitate was redissolved in DMF to 15 wt % and reprecipitated into 50 ml toluene/methanol (3:2 v/v). The solids were collected and dried under vacuum at room temperature overnight and at 80° C. for 0.45 h, yielding 0.21 g solids (Mw 144,000). The resulting cell from substrates exposed with 0.5 J/cm² showed o alignment quality, −9 degrees pretilt and a VHR at 75° C. of 0.86.

EXAMPLE 18

The following example illustrates good quality alignment and pretilt in a novel hybrid polymer of the invention synthesized following Method 2. This example illustrates the usefulness of chalcone containing addition monomers for good photoalignment and pretilt.

Hybrid Polymer 4

A mixture of Activated Polyimide 1 (200 mg, nominally 174 mg solids), Addition Monomer 4 (541 mg) and Addition Monomer 3 (60 mg) was dissolved in 26 g dimethylformamide (DMF) containing 26 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 25 wt % and the residue was precipitated into 50 ml toluene/methanol (3:2 v/v). The precipitate was redissolved in DMF to 15 wt % and reprecipitated into 50 ml toluene/methanol (3:2 v/v). The solids were collected and dried under vacuum at room temperature overnight, then at 80° C. for 45 min, yielding 0.23 g solids (Mw 120,000). A solution of this material was prepared for spin coating by stirring a 2 wt % BL solution for 20 h. The resulting cell from substrates exposed with 0.2 J/cm² showed Δ alignment quality, −2 degrees pretilt and a VHR at 75° C. of 0.78.

EXAMPLE 19

The following example illustrates alignment in a ferroelectric liquid crystal (FLC) cell using a novel hybrid polymer of the invention as the aligning layer. The polymer was synthesized following Method 2, whereby the activated polyimide is functionalized by placing polymerizable allyl groups on the diamines. One of the addition monomers contains a fluoroalkyl group to induce pre-tilt.

Hybrid Polymer 5

A mixture of Activated Polyimide 1 (2.80 g, nominally 2.44 g solids), Addition Monomer 1 (7.98 g) and Addition Monomer 3 (0.42 g) was dissolved in 364 g DMF containing 364 mg AIBN. The solution was degassed by four consecutive freeze-pump-thaw cycles, sealed under vacuum and then stirred at 60° C. for 15.5 h. The solvent was removed at reduced pressure (1 mmHg/30° C.) to 20 wt % and the residue was precipitated into 600 ml toluene/methanol (3:2, v/v). The precipitate was redissolved in DMF to 20 wt % and reprecipitated into 600 ml toluene/methanol (3:2, v/v). The solids were collected and dried under vacuum at room temperature for 1.5 h and at 80° C. for 2 h, yielding 3.72 g solids (Mw 153,000).

FLC cells were prepared using alignment layers spin-coated from a 2 wt % BL solution. The substrates and cells were prepared in a manner similar to Example 15 except that the cell was assembled with the optically generated alignment directions parallel and the cell spacing was 1.7 microns. Using techniques known by those skilled in the art, the cell was subsequently capillary filled with ferroelectric liquid crystal at 85° C. and slowly cooled to room temperature, particularly through the smectic A to the ferroelectric C* phases of the liquid crystal. Substrates irradiated at 1.0 J/cm² generated cells with regions of Δ++ alignment.

EXAMPLE 20

The following example illustrates alignment in a ferroelectric liquid crystal (FLC) cell using a novel hybrid polymer of the invention as the aligning layer. The polymer was synthesized following Method 2, whereby the activated polyimide is functionalized by placing polymerizable allyl groups on the diamines. One of the addition monomers contains a long chain alkyl group to induce pre-tilt.

Hybrid Polymer 6

A mixture of Activated Polyimide 1 (200 mg, nominally 168 mg solids), Addition Monomer 1 (560 mg) and octadecyl methacrylate (40 mg) was dissolved in 26 g dimethylformamide (DMF) containing 26 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 25 wt % and the residue was precipitated into 50 ml toluene/methanol (3:2 v/v). The precipitate was redissolved in DMF to 15 wt % and reprecipitated into 50 ml toluene/methanol (3:2 v/v). The solids were collected and dried under vacuum at room temperature overnight and at 80° C. for 0.45 h, yielding 0.217 g solids (Mw 133,000). FLC cells were prepared as in Example 19, and substrates irradiated at 1.0 J/cm² exhibited regions of Δ++ alignment.

EXAMPLE 21

The following example illustrates good quality alignment in a novel hybrid polymer of the invention prepared following Method 2, using Addition Monomer 5, a cinnamate containing monomer that has a 2-carbon chain between the methacrylate and the cinnamate groups.

Hybrid Polymer 7

A mixture of Activated Polyimide 1 (200 mg, nominally 168 mg solids), Addition Monomer 5 (570 mg) and Addition Monomer 3 (30 mg) was dissolved in 26 g dimethylformamide (DMF) containing 26 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 25 wt % and the residue was precipitated into 50 ml toluene/methanol (3:2 v/v). The precipitate was redissolved in DMF to 15 wt % and reprecipitated into 50 ml toluene/methanol (3:2 v/v). The solids were collected and dried under vacuum at room temperature overnight and at 80° C. for 45 min, yielding 0.32 g solids (Mw 158,000). The resulting cell from substrates exposed with 0.5 J/cm² showed Δ++ alignment quality and a VHR at 75° C. of 0.58.

EXAMPLE 22

The following example illustrates a novel hybrid polymer of the invention showing good alignment and pretilt prepared following Method 2. In this example, an addition monomer containing a twelve carbon alkyl chain is used to induce pretilt, demonstrating that a range of alkyl chain lengths are useful for the hybrid polymers of the invention.

Hybrid Polymer 8

A mixture of Activated Polyimide 1 (310.2 mg, nominally 218 mg), Addition Monomer 1 (728.1 mg) and lauryl methacrylate (52 mg) was dissolved in 33.8 g dimethylformamide (DMF) containing 34 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 20 wt % and the residue was precipitated into 65 ml toluene/methanol (3:2 v/v). The precipitate was redissolved in DMF to 12 wt % and reprecipitated into 65 ml toluene/methanol (3:2 v/v). The solids were collected and dried under vacuum at room temperature overnight and at 80° C. for 0.45 h, yielding 0.29 g solids (Mw 211,000). The resulting cell from substrates exposed with 0.2 J/cm² showed ○ alignment quality, −14.8 degrees pretilt and a VHR at 75° C. of 0.73.

EXAMPLE 23

The following example illustrates a novel hybrid polymer of the invention showing good alignment and pretilt prepared following Method 2. In this example, an addition monomer containing a perfluorinated chain is used to induce pretilt.

Hybrid Polymer 9

A mixture of Activated Polyimide 1 (200 mg, nominally 174 mg), Addition Monomer 1 (570 mg) and 1H,1H-pentadecafluorooctyl methacrylate (30 mg) was dissolved in 26 g dimethylformamide (DMF) containing 26 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 25 wt % and the residue was precipitated into 50 ml toluene/methanol (3:2 v/v). The precipitate was redissolved in DMF to 15 wt % and reprecipitated into 50 ml toluene/methanol (3:2 v/v). The solids were collected and dried under vacuum at room temperature for 2 h and at 80° C. for 1 h, yielding 0.23 g solids (Mw 163,000). The resulting cell from substrates exposed with 0.2 J/cm² showed Δ+ alignment quality, −18.1 degrees pretilt and a VHR at 75° C. of 0.83.

EXAMPLE 24

The following example illustrates a novel hybrid polymer of the invention showing good alignment and pretilt prepared following Method 2. In this example, an addition monomer containing a perfluorinated chain and a cinnamate is used to induce pretilt.

Hybrid Polymer 10

A mixture of Activated Polyimide 1 (199 mg, nominally 174 mg), Addition Monomer 1 (571 mg) and Addition Monomer 6 (30 mg) was dissolved in 26 g dimethylformamide (DMF) containing 26 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 25 wt % and the residue was precipitated into 50 ml toluene/methanol (3:2 v/v). The precipitate was redissolved in DMF to 15 wt % and reprecipitated into 50 ml toluene/methanol (3:2 v/v). The solids were collected and dried under vacuum at room temperature for 2 h and at 80° C. for 1 h, yielding 0.21 g solids (Mw 156,000). The resulting cell from substrates exposed with 0.3 J/cm² showed Δ+ alignment quality, −16.3 degrees pretilt and a VHR at 75° C. of 0.92.

EXAMPLE 25

The following example illustrates a novel hybrid polymer of the invention showing good alignment and pretilt prepared following Method 2. This example demonstrates that a range of diamines can be useful in the preparation of the hybrid polymers of the invention.

Hybrid Polymer 11

A mixture of Activated Polyimide 2 (201 mg), Addition Monomer 1 (571 mg) and Addition Monomer 3 (30 mg) was dissolved in 26.0 g dimethylformamide (DMF) containing 26 mg azobisisobutyronitrile (AIBN). The solution was degassed by three consecutive freeze-pump-thaw cycles, sealed under vacuum and then stirred at 60° C. for 15.5 h. The solvent was removed at reduced pressure (1 mmHg/30° C.) to 19 wt % and the residue was precipitated into 50 ml toluene/methanol (3:2 v/v). The precipitate was redissolved in DMF to 15 wt % and reprecipitated into 50 ml toluene/methanol (3:2 v/v). The solids were collected and dried under vacuum at room temperature overnight, yielding 0.12 g solids (Mw 445,000). The resulting cell from substrates exposed with 0.1 J/cm$^2$ showed Δ++ alignment quality, −6.4 degrees pretilt and a VHR at 75° C. of 0.72.

EXAMPLE 26

The following example illustrates good quality alignment and pretilt in a novel hybrid polymer of the invention synthesized following Method 4, whereby a functionalized addition polymer is reacted with diamines and dianhydrides and then chemically imidized to give the novel hybrid polymer of this example.

Hybrid Polymer 12

Functionalized Addition Polymer 1 (1.05 g of a 10 wt % solution in NMP) and N,N-diallyl-1,2,4-benzenetriamine (76.5 mg, 0.377 mmol) were dissolved in 1.33 g anhydrous NMP under nitrogen atmosphere. Solid 1,2,3,4-cyclobutanetetracarboxylic dianhydride (71.2 mg, 0.363 mmol) was added and the solution was stirred for 18 h at 21° C. A mixture of 0.11 g acetic anhydride, 47 mg pyridine and 0.64 g NMP was added and the solution stirred at 50° C. for 4 additional hours. The polyimide was precipitated by addition to 200 ml of methanol. The solid was washed with additional portions of methanol, and then dried under vacuum (0.2 mmHg) at room temperature overnight, yielding 210 mg solids (Mw 44,000). The resulting cell from substrates exposed with 0.2 J/cm$^2$ showed Δ+ alignment quality, −4.6 degrees pretilt and a VHR at 75° C. of 0.86.

EXAMPLE 27

The following example illustrates good quality alignment and pretilt in a novel hybrid polymer of the invention synthesized following Method 4. This example, along with Example 26, demonstrates that functionalized addition polymers with a range of molecular weights are useful in the preparation of the novel hybrid polymers of the invention.

Hybrid Polymer 13

Functionalized Addition Polymer 2 (1.05 g of a 10 wt % solution in NMP) and N,N-diallyl-1,2,4-benzenetriamine (74.4 mg, 0.366 mmol) were dissolved in 1.31 g anhydrous NMP under nitrogen atmosphere. Solid 1,2,3,4-cyclobutanetetracarboxylic dianhydride (70.5 mg, 0.359 mmol) was added and the solution was stirred for 18 h at 21° C. A mixture of 0.11 g acetic anhydride, 47 mg pyridine and 0.63 g NMP was added and the solution stirred at 50° C. for 4 additional hours. The polyimide was precipitated by addition to 200 ml of methanol. The solid was washed with additional portions of methanol, and then dried under vacuum (0.2 mmHg) at room temperature overnight, yielding 230 mg of solids (Mw 219,000). The resulting cell from substrates exposed with 0.2 J/cm$^2$ showed o alignment quality, −11 degrees pretilt and a VHR at 75° C. of 0.74.

EXAMPLE 28

The following example illustrates good quality alignment and pre-tilt in a novel hybrid polymer of the invention synthesized following Method 4. This example demonstrates good pre-tilt using a functionalized addition polymer containing a $C_{1-8}$ alkyl chain.

Hybrid Polymer 14

Functionalized Addition Polymer 3 (1.40 g of a 10 wt % solution in NMP) and N,N-diallyl-1,2,4-benzenetriamine (94.6 mg, 0.466 mmol) were dissolved in 1.71 g anhydrous NMP under nitrogen atmosphere. Solid 1,2,3,4-cyclobutanetetracarboxylic dianhydride (94.9 mg, 0.484 mmol) was added and the solution was stirred for 18 h at 21° C. A mixture of 0.15 g acetic anhydride, 63 mg pyridine and 0.82 g NMP was added and the solution stirred at 50° C. for 4 additional hours. The polyimide was precipitated by addition to 200 ml of methanol. The solid was washed with additional portions of methanol, and then dried under vacuum (0.2 mmHg) at room temperature overnight to give 307 mg solids (Mw 260,000). The resulting cell from substrates exposed with 0.5 J/cm$^2$ showed o alignment quality, −17 degrees pretilt and a VHR at 75° C. of 0.82.

EXAMPLE 29

The following example illustrates good quality alignment and pre-tilt in a novel hybrid polymer of the invention synthesized following Method 4. This example demonstrates good pre-tilt using a functionalized addition polymer containing a fluorinated chain. In this example, the functionalized addition polymer containing amine groups is reacted with an activated polyimide. The activated polyimide is an anhydride end-capped, poly(amic acid) prepared by using a stoichiometric excess of dianhydride.

Hybrid Polymer 15

N,N-Diallyl-1,2,4-benzenetriamine (70.8 mg, 0.348 mmol) was dissolved in 0.60 g anhydrous NMP under a nitrogen atmosphere. Solid 1,2,3,4-cyclobutanetetracarboxylic dianhydride (78.1 mg, 0.398 mmol) was added and the solution was stirred for 3 h at 21° C. (Mw 4,400). NMP (0.74 g) and Functionalized Addition Polymer 1 (1.05 g of a 10 wt % solution in NMP) were added and the solution stirred for a further 19 h. A mixture of 0.11 g acetic anhydride, 0.047 g pyridine and 0.64 g NMP was added and the solution stirred at 50° C. for 4 additional hours. The hybrid polymer was precipitated by addition to 200 ml of methanol. The solid was washed with additional portions of methanol, and then dried under vacuum (0.2 mmHg) at room temperature overnight to give 198 mg solids (Mw 43,000). The resulting cell from substrates exposed with 0.2 J/cm$^2$ showed Δ++ alignment quality, −2.2 degrees pretilt and a VHR at 75° C. of 0.79.

We claim:

1. A branched hybrid polymer that is prepared from (a) at least one component selected from the group consisting of macromonomers and polymers within the class of polyimides, poly(amic acids) and esters thereof wherein the at least one component comprises at least one addition polymerization moiety as a sidechain, and (b) at least one component selected from the group consisting of addition monomers and functionalized addition polymers wherein the components (a) and (b) are covalently bonded to form a copolymer and wherein at least one of (a) is prepared from

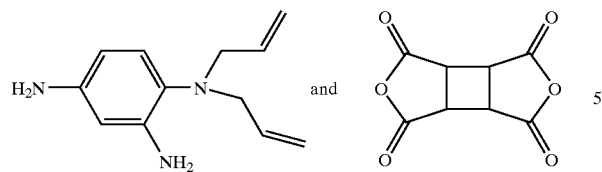
2. A branched hybrid polymer of claim 1 wherein (b) comprises
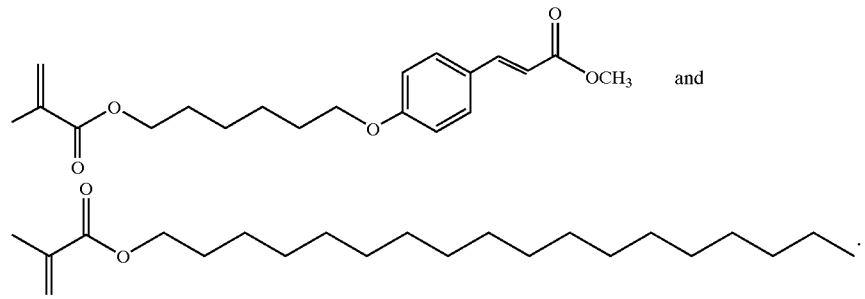
3. A branched hybrid polymer of claim 1 wherein (b) comprises
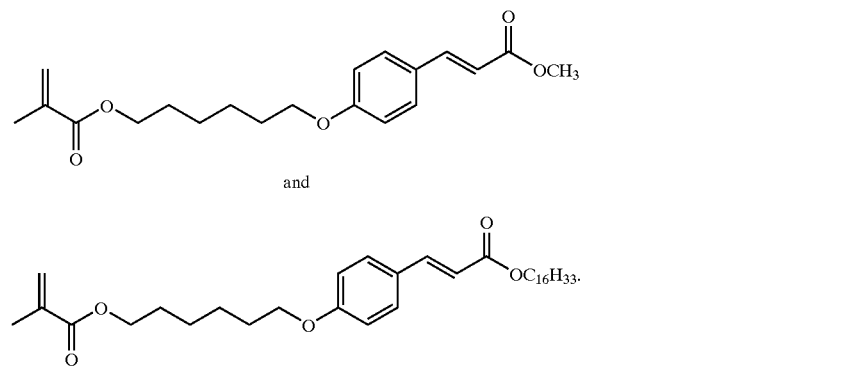
4. A branched hybrid polymer of claim 1 wherein (b) comprises
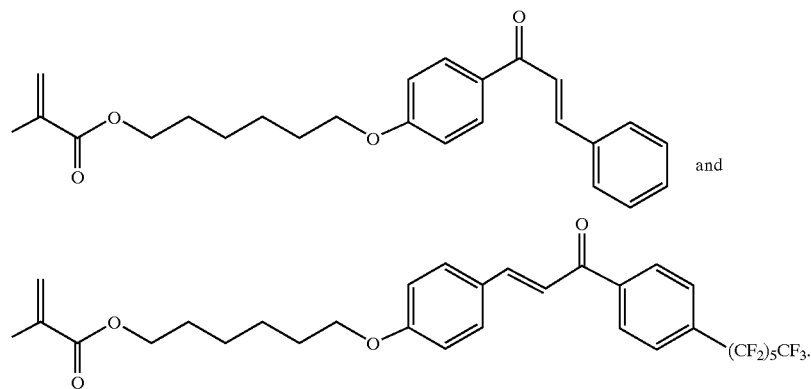

5. A branched hybrid polymer of claim 1 wherein (b) comprises
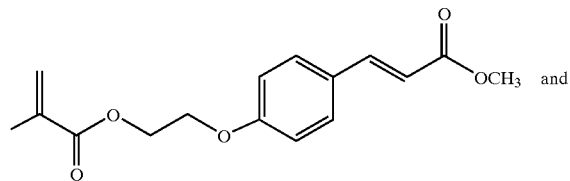
and
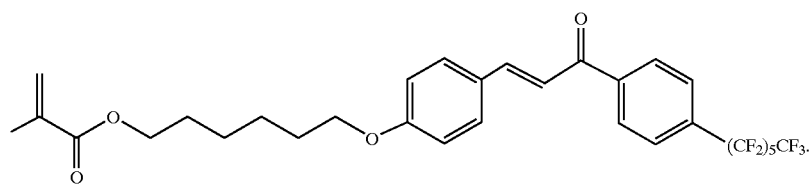
6. A branched hybrid polymer of claim 1 wherein (b) comprises
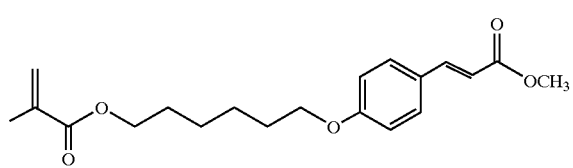
and
-continued
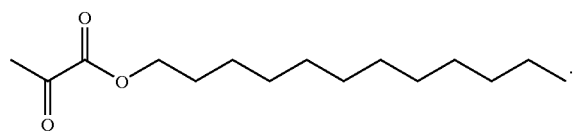
7. A branched hybrid polymer of claim 1 wherein (b) comprises
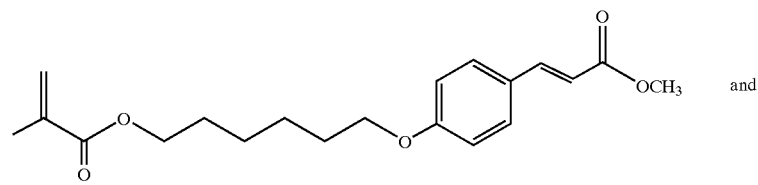
and
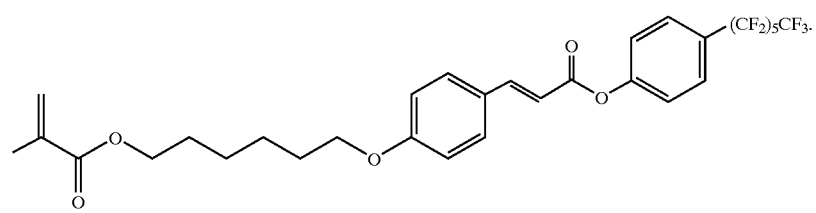

8. A branched hybrid polymer of claim 1 wherein
(b) comprises

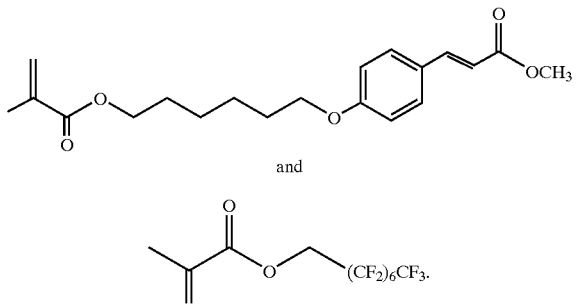

and

9. A branched hybrid polymer that is prepared from
(a) at least one component selected from the group consisting of macromonomers and polymers within the class of polyimides, poly(amic acids) and esters thereof which comprise at least one addition polymerization moiety as a sidechain, and (b) at least one component selected from the group consisting of addition monomers and functionalized addition polymers wherein the components (a) and (b) are covalently bonded to form a copolymer and wherein at least one of (a) is prepared from

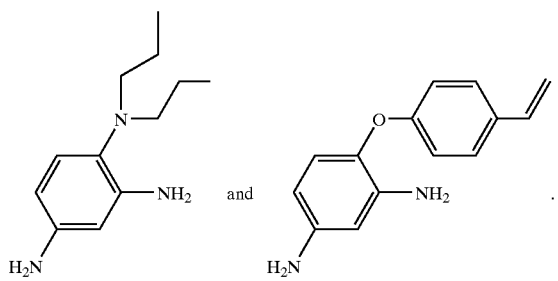

10. A branched hybrid polymer of claim 9 wherein
(b) comprises

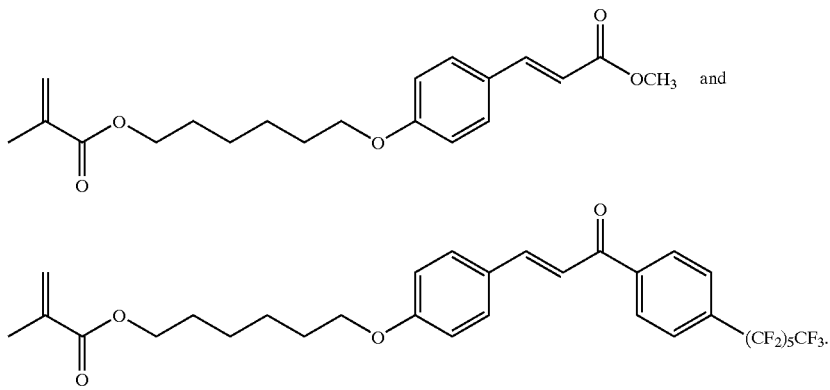

* * * * *